US012777516B2

(12) United States Patent
Ly et al.

(10) Patent No.: US 12,777,516 B2
(45) Date of Patent: Oct. 27, 2026

(54) RESPONSE TO UE REQUESTING MSG3 PUSCH REPETITIONS

(71) Applicant: QUALCOMM Incorporated, San Diego, CA (US)

(72) Inventors: Hung Dinh Ly, San Diego, CA (US); Mahmoud Taherzadeh Boroujeni, San Diego, CA (US); Kexin Xiao, Shanghai (CN)

(73) Assignee: QUALCOMM Incorproated, San Diego, CA (US)

( * ) Notice: Subject to any disclaimer, the term of this patent is extended or adjusted under 35 U.S.C. 154(b) by 317 days.

(21) Appl. No.: 18/288,175

(22) PCT Filed: Jul. 1, 2021

(86) PCT No.: PCT/CN2021/103964

§ 371 (c)(1),
(2) Date: Oct. 24, 2023

(87) PCT Pub. No.: WO2023/272675

PCT Pub. Date: Jan. 5, 2023

(65) Prior Publication Data

US 2024/0215063 A1 Jun. 27, 2024

(51) Int. Cl.

*H04W 74/00* (2009.01)
*H04L 1/1812* (2023.01)
*H04W 74/0833* (2024.01)

(52) U.S. Cl.

CPC ......... *H04W 74/004* (2013.01); *H04L 1/1816* (2013.01); *H04W 74/0833* (2013.01)

(58) Field of Classification Search

CPC ......... H04W 74/0004; H04W 74/0833; H04W 74/002; H04L 1/1816; H04L 1/08; H04L 1/18; H04L 5/0094; H04L 5/0044

(Continued)

(56) References Cited

U.S. PATENT DOCUMENTS

2015/0092740 A1 4/2015 Li et al.
2018/0270855 A1 9/2018 Loehr et al.

(Continued)

FOREIGN PATENT DOCUMENTS

CN 112970319 A 6/2021

OTHER PUBLICATIONS

Apple Inc: "Discussion on Msg3 Coverage Enhancement", R1-2103119, 3rd Generation Partnership Project, Mobile Competence Centre, 650, Route Des Lucioles, F-06921 Sophia-antipolis Cedex, France, vol. RAN WG1, No. e-Meeting, Apr. 12, 2021-Apr. 20, 2021, Apr. 7, 2021, 3 Pages, XP052177920, section 2.1.

(Continued)

*Primary Examiner* — Candal Elpenord
(74) *Attorney, Agent, or Firm* — Polsinelli

(57) ABSTRACT

This disclosure provides systems, devices, apparatus, and methods, including computer programs encoded on storage media, for responses to Msg3 PUSCH repetition requests of a UE. In a first aspect, the UE may transmit, to a base station, a request for repetitions of at least one of a PUSCH transmission or a PUSCH retransmission for a random access Msg3 and receive, from the base station, an indication to use one or more fields to determine a number of repetitions of the at least one of the PUSCH transmission or the PUSCH retransmission for the random access Msg3. In (Continued)

a second aspect, the transmitted request may indicate to the base station to use the one or more fields to determine the number of the repetitions of the at least one of the PUSCH transmission or the PUSCH retransmission. The UE may transmit the number of repetitions based on the transmitted indication.

21 Claims, 16 Drawing Sheets

(58) Field of Classification Search
USPC .................................................. 370/329–330
See application file for complete search history.

(56) References Cited

U.S. PATENT DOCUMENTS

| | | | | |
|---|---|---|---|---|
| 2019/0215872 | A1 | 7/2019 | Park et al. | |
| 2021/0360660 | A1* | 11/2021 | Cozzo | H04W 72/535 |
| 2022/0232639 | A1* | 7/2022 | Wang | H04L 5/0053 |
| 2023/0125571 | A1* | 4/2023 | MolavianJazi | H04L 1/08 370/329 |
| 2023/0247680 | A1* | 8/2023 | Seok | H04L 1/1854 |
| 2024/0215015 | A1* | 6/2024 | Su | H04L 5/1469 |
| 2024/0283559 | A1* | 8/2024 | Echigo | H04L 1/08 |
| 2024/0324027 | A1* | 9/2024 | Sedin | H04W 8/22 |

OTHER PUBLICATIONS

Apple Inc: “Discussion on Msg3 Coverage Enhancement”, R1-2105123, 3rd Generation Partnership Project, Mobile Competence Centre, 650, Route Des Lucioles, F-06921 Sophia-antipolis Cedex, France, vol. RAN WG1, No. e-Meeting, May 10, 2021-May 27, 2021, May 12, 2021, XP052011211, 4 Pages, p. 1, Opt. 2-1, p. 1, Opt. 2-1, list item 1, p. 1, Opt. 2-1, list item 2, p. 2, sec. 2.2, sentence blw Proposal 2, p. 2, sec. 2.2, Opt. 1, p. 2, sec. 2.2, Proposal 2, p. 2, sec. 2.2, Agreement, bullet, p. 2, sec. 2.2, par. blw. Agreement, p. 3, sec. 3, Proposal 1.

Supplementary European Search Report—EP21947628—Search Authority—The Hague—Feb. 10, 2025.

Ericsson: “Solutions to Coverage Issues for Msg3 Transmissions”, 3GPP TGS-RAN WG2 #102, R2-1807028, Busan, Republic of Korea, May 21-25, 2018, pp. 1-4, May 25, 2018 (May 25, 2018), the whole document, section 2.

International Search Report and Written Opinion—PCT/CN2021/103964—ISA/EPO—Mar. 28, 2022.

* cited by examiner

450

| **Message** | **PHY Channel** | **Content** |
|---|---|---|
| Msg1 | PRACH | PRACH preamble |
| Msg2 | PDCCH, PDSCH (RAR) | Timing advance, UL grant for Msg3, TC-RNTI, etc. |
| Msg3 | PUSCH | RRC connection request, scheduling request, buffer status, etc. |
| Msg4 | PDCCH, PDSCH | Contention resolution message |

800

| RAR Grant Field | Number of Bits |
|---|---|
| Frequency hopping indicator | 1 |
| PUSCH frequency resource allocation | 14 for procedures without shared spectrum channel access<br>12 for procedures with shared spectrum channel access |
| PUSCH time resource allocation | 4 |
| MCS | 4 |
| TPC command for PUSCH | 3 |
| CSI request | 1 |
| Channel Access-CPext | 0 for procedures without shared spectrum channel access<br>2 for procedures with shared spectrum channel access |

FIG. 8

RESPONSE TO UE REQUESTING MSG3 PUSCH REPETITIONS

CROSS REFERENCE TO RELATED APPLICATION(S)

This application is a National Stage Application filed under 35 U.S.C. § 371 of PCT International Application No. PCT/CN2021/103964, entitled "RESPONSE TO UE REQUESTING MSG3 PUSCH REPETITIONS" and filed Jul. 1, 2021, which is expressly incorporated by reference herein in its entirety.

TECHNICAL FIELD

The present disclosure relates generally to communication systems, and more particularly, to wireless communication including a random access message (Msg)3 physical uplink shared channel (PUSCH).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IOT)), and other requirements. 5G NR includes services associated with enhanced mobile broadband (eMBB), massive machine type communications (mMTC), and ultra-reliable low latency communication (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may transmit, to a base station, a request for repetitions of at least one of a physical uplink shared channel (PUSCH) transmission or a PUSCH retransmission for a random access message (Msg)3; receive, from the base station, an indication to use one or more fields to determine a number of repetitions of the at least one of the PUSCH transmission or the PUSCH retransmission for the random access Msg3; and transmit the number of repetitions of the at least one of the PUSCH transmission or the PUSCH retransmission based on the use of the one or more fields to determine the number of repetitions of the at least one of the PUSCH transmission or the PUSCH retransmission for the random access Msg3.

In another aspect of the disclosure, a method, a computer-readable medium, and an apparatus are provided. The apparatus may transmit, to a base station, an indication for repetitions of at least one of a PUSCH transmission or a PUSCH retransmission for a random access Msg3, where the transmitted indication indicates to the base station to use one or more fields to determine a number of the repetitions of the at least one of the PUSCH transmission or the PUSCH retransmission for the random access Msg3; and transmit the number of repetitions of the at least one of the PUSCH transmission or the PUSCH retransmission based on the transmitted indication.

In a further aspect of the disclosure, a method, a computer-readable medium, and an apparatus are provided. The apparatus may receive, from a user equipment (UE), a request for repetitions of at least one of a PUSCH transmission or a PUSCH retransmission for a random access Msg3; transmit, to the UE, an indication to use one or more fields to determine a number of repetitions of the at least one of the PUSCH transmission or the PUSCH retransmission for the random access Msg3; and receive the number of repetitions of the at least one of the PUSCH transmission or the PUSCH retransmission based on the indication use the one or more fields to determine the number of repetitions of the at least one of the PUSCH transmission or the PUSCH retransmission for the random access Msg3.

In still a further aspect of the disclosure, a method, a computer-readable medium, and an apparatus are provided. The apparatus may receive, from a UE, an indication for repetitions of at least one of a PUSCH transmission or a PUSCH retransmission for a random access Msg3, where the received indication indicates to the base station one or more fields to determine a number of the repetitions of the at least one of the PUSCH transmission or the PUSCH retransmission for the random access Msg3; and receive the number of repetitions of the at least one of the PUSCH transmission or the PUSCH retransmission based on the received indication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 8 is a table indicative of random access response (RAR) grant content fields.

DETAILED DESCRIPTION

Figure 1:
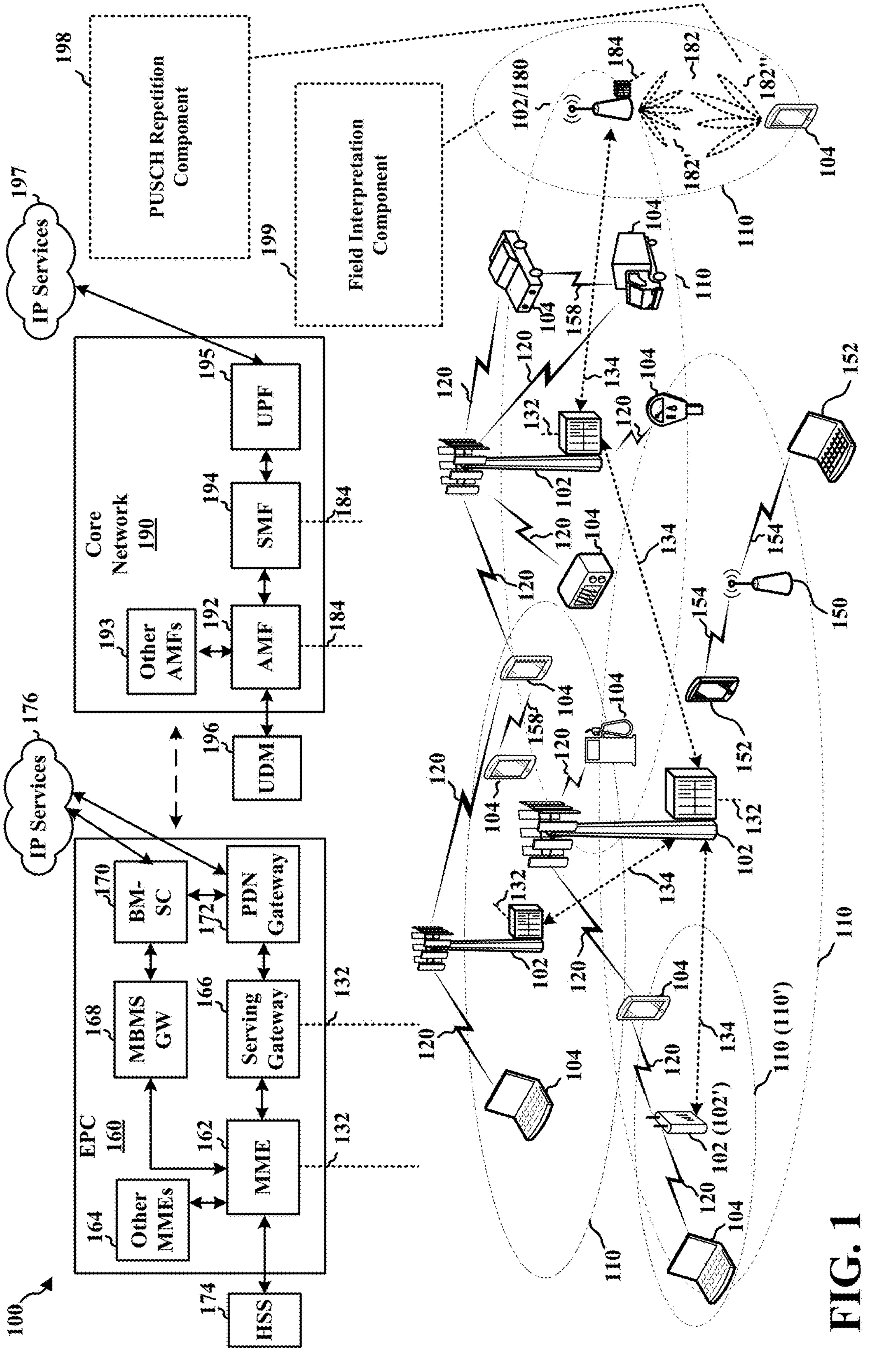
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, user equipments (UEs) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., SI interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term “millimeter wave” or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a physical uplink shared channel (PUSCH) repetition component 198 configured to transmit, to a base station, a request for repetitions of at least one of a PUSCH transmission or a PUSCH retransmission for a random access message (Msg)3; receive, from the base station, an indication to use one or more fields to determine a number of repetitions of the at least one of the PUSCH transmission or the PUSCH retransmission for the random access Msg3; and transmit the number of repetitions of the at least one of the PUSCH transmission or the PUSCH retransmission based on the use of the one or more fields to determine the number of repetitions of the at least one of the PUSCH transmission or the PUSCH retransmission for the random access Msg3. The PUSCH repetition component 198 may be further configured to transmit, to a base station, an indication for repetitions of at least one of a PUSCH transmission or a PUSCH retransmission for a random access Msg3, where the transmitted indication indicates to the base station to use one or more fields to determine a number of the repetitions of the at least one of the PUSCH transmission or the PUSCH retransmission for the random access Msg3; and transmit the number of repetitions of the at least one of the PUSCH transmission or the PUSCH retransmission based on the transmitted indication.

In certain aspects, the base station 180 may include a field interpretation component 199 configured to receive, from a UE, a request for repetitions of at least one of a PUSCH transmission or a PUSCH retransmission for a random access Msg3; transmit, to the UE, an indication to use one or more fields to determine a number of repetitions of the at least one of the PUSCH transmission or the PUSCH retransmission for the random access Msg3; and receive the number of repetitions of the at least one of the PUSCH transmission or the PUSCH retransmission based on the indication use the one or more fields to determine the number of repetitions of the at least one of the PUSCH transmission or the PUSCH retransmission for the random access Msg3. The field interpretation component 199 may be further configured to receive, from a UE, an indication for repetitions of at least one of a PUSCH transmission or a PUSCH retransmission for a random access Msg3, where the received indication indicates to the base station one or more fields to determine a number of the repetitions of the at least one of the PUSCH transmission or the PUSCH retransmission for the random access Msg3; and receive the number of repetitions of the at least one of the PUSCH transmission or the PUSCH retransmission based on the received indication. Although the following description may be focused on 5G NR, the concepts described herein may be applicable to other similar areas, such as LTE, LTE-A, CDMA, GSM, and other wireless technologies.

Figures 2A, 2B, 2C, 2D:
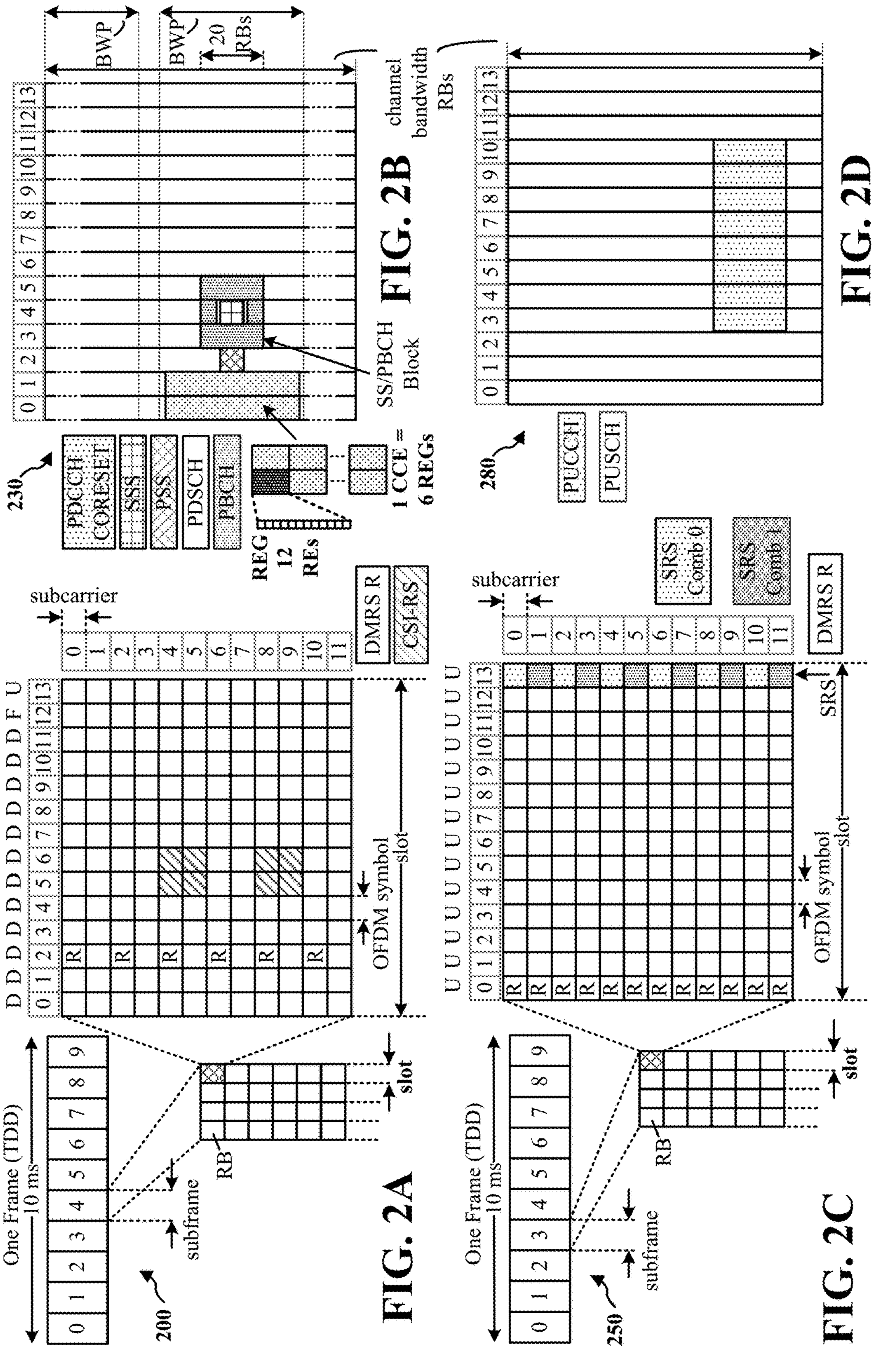
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
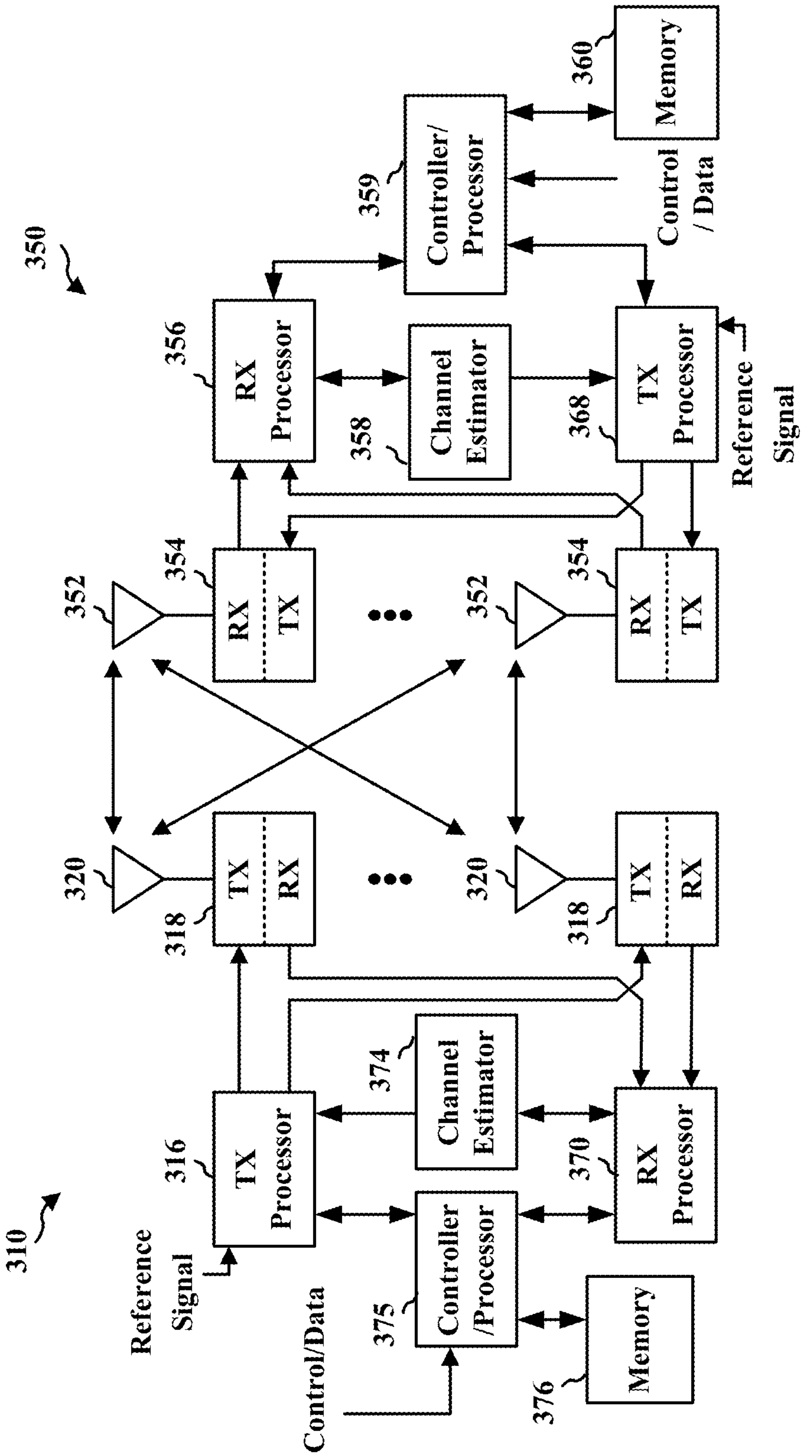
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the PUSCH repetition component 198 of FIG. 1.

At least one of the TX processor 316, the RX processor 370, and the controller/processor 375 may be configured to perform aspects in connection with the field interpretation component 199 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and ultra-reliable low latency communication (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
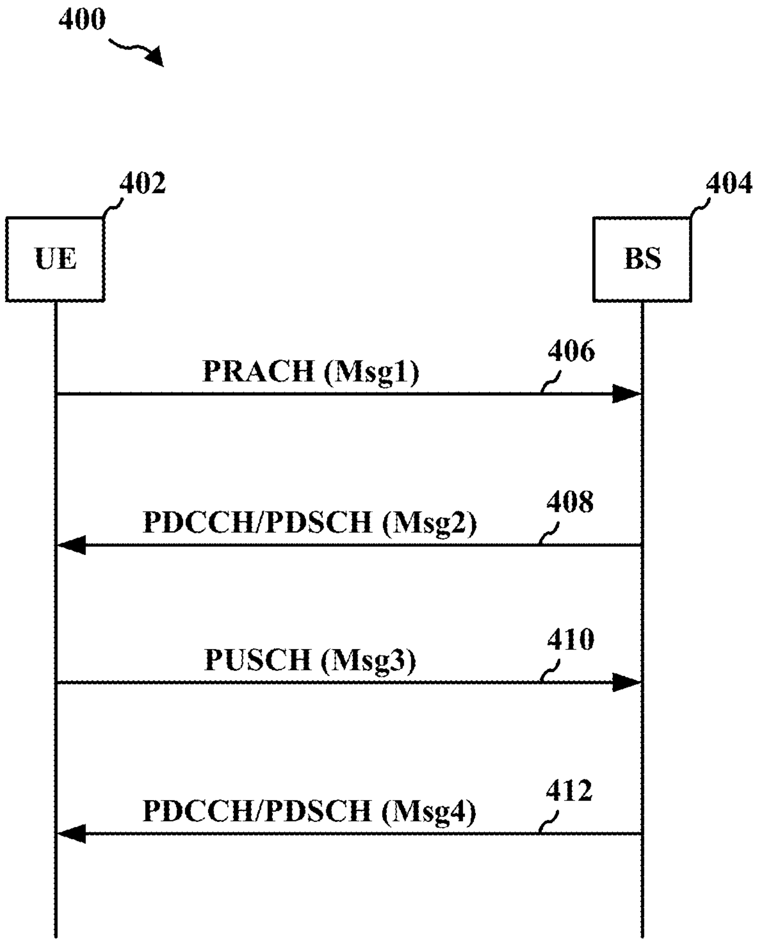
FIG. 4 illustrates a call flow diagram and a corresponding table indicative of a 4-step random access channel (RACH) procedure.

A UE may use a random access procedure in order to communicate with a base station. For example, the UE may use the random access procedure to request an RRC connection, to re-establish an RRC connection, resume an RRC connection, etc. A UE may use a random access procedure in order to communicate with a base station. For example, the UE may use the random access procedure to request an RRC connection, to re-establish an RRC connection, resume an RRC connection, etc. FIG. 4 illustrates a call flow diagram 400 and a corresponding table 450 indicative of a 4-step random access channel (RACH) procedure. A UE 402 may initiate a random access procedure by transmitting, at 406, a Msg1 in a physical random access channel (PRACH) to a base station 404. Prior to sending the Msg 1 406, the UE 402 may obtain random access parameters, e.g., including preamble format parameters, time and frequency resources, parameters for determining root sequences and/or cyclic shifts for a random access preamble, etc., e.g., in system information from the base station 404. The PRACH transmitted, at 406, to the base station 404 may include a PRACH preamble, as indicated in the table 450. The preamble may be transmitted with an identifier, such as a Random Access RNTI (RA-RNTI). The UE 402 may randomly select a random access preamble sequence, e.g., from a set of preamble sequences. If the UE 402 randomly selects the preamble sequence, the base station 404 may receive another preamble from a different UE at the same time. In some examples, a preamble sequence may be assigned to the UE 402.

The base station 404 may transmit, at 408, a Msg2 to the UE 402 in response to receiving, at 406, the Msg1 from the UE 402. The Msg2 may be transmitted, at 408, in a PDCCH or a PDSCH, which may correspond to a random access response (RAR). As indicated in the table 450, the Msg2 may be indicative of a timing advance, an UL grant for a Msg3, a temporary cell-radio network temporary identifier (TC-RNTI), etc. The PDCCH may include scheduling information for the PDSCH, such that the UE 402 may receive the PDSCH based on a scheduling grant. The UE 402 may decode the PDCCH to determine the scheduling grant for the PDSCH.

If the UE 402 successfully decodes the Msg2 received, at 408, the UE 402 may transmit, at 410, the Msg3 to the base station 404. For example, the UE 402 may transmit the Msg3 to the base station 404 via PUSCH. The Msg3 may include an RRC connection request, an RRC connection re-establishment request, or an RRC connection resume request, a scheduling request, a buffer status, etc., as indicated in the table 450.

In response to receiving the Msg3, at 410, the base station 404 may transmit, at 412, a Msg4 to the UE 402. The Msg4 may be indicative of a payload carried via PDSCH or scheduling information carried via PDCCH. The Msg4 may correspond to a contention resolution message, as indicated in the table 450. The Msg 4, 412, may include a random access response message that includes timing advancement information, contention resolution information, and/or RRC connection setup information. The UE 402 may monitor for PDCCH, e.g., with the C-RNTI. If the PDCCH is successfully decoded, the UE 402 may also decode a corresponding PDSCH. The UE 402 may send HARQ feedback for any data carried in the Msg4. If two UEs sent a same preamble at 406, both UEs may receive the RAR (Msg2 408) leading both UEs to send a Msg3 410. The base station 404 may resolve such a collision by being able to decode the third random access message from only one of the UEs and responding with a Msg4 412 to that UE. The other UE, which did not receive the Msg4 412, may determine that random access did not succeed and may re-attempt random access. Thus, the Msg4 412 may be referred to as a contention resolution message. The Msg4 412 may complete the random access procedure. Thus, the UE 402 may then transmit uplink communication and/or receive downlink communication with the base station 404 based on the RAR (Msg2 408).

Figure 5:
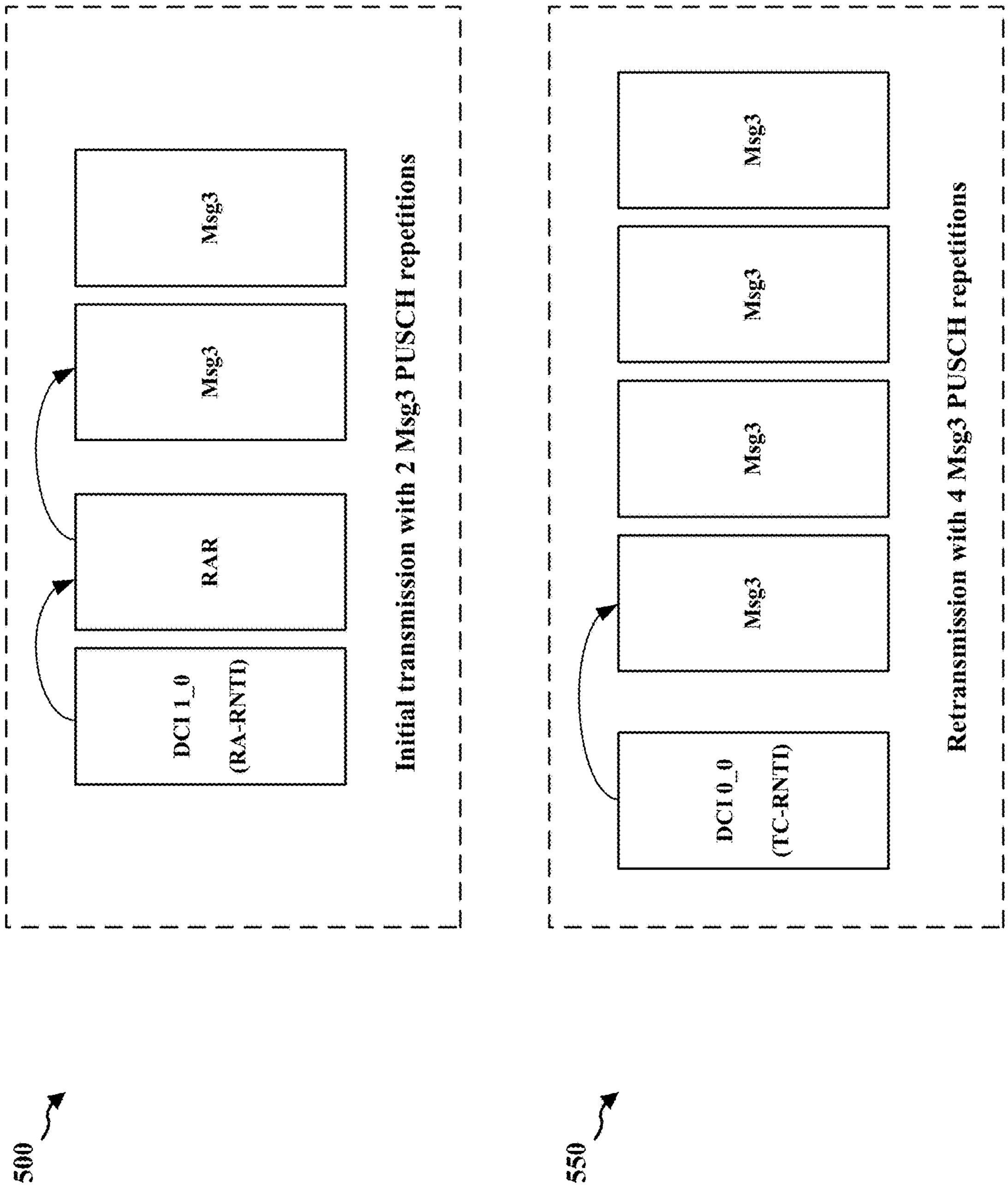
FIG. 5 illustrates message (Msg)3 physical uplink shared channel (PUSCH) repetition diagrams.

FIG. 5 illustrates Msg3 PUSCH repetition diagrams 500-550. In some examples, Msg3 PUSCH transmissions may bottleneck the 4-step RACH procedure illustrated in the call flow diagram 500, as the carriers for such transmissions may be smaller than the carriers of other channels. Thus, a mechanism may be indicated for enabling PUSCH repetitions associated with Msg3. Multiple retransmissions may be performed to provide the Msg3 to the base station for decoding. For example, the Msg3 PUSCH repetition diagram 550 indicates that after the DCI 0_0 is received by the UE, 4 Msg3 PUSCH repetitions may be performed on retransmission. The DCI 0_0 may include cyclic redundancy check (CRC) bits scrambled by a TC-RNTI. The 4 retransmissions/Msg3 PUSCH repetitions may be performed if an initial Msg3 transmission fails.

In the Msg3 PUSCH repetition diagram 500, scheduling information for the initial transmission and the retransmissions may be carried via different DCI indicative of the PDSCH. For example, the initial transmission in the diagram 500 may be associated with two Msg3 PUSCH repetitions. An indication of the two Msg3 PUSCH repetitions may be provided via RAR based on DCI 1_0 including CRC bits scrambled by a random access (RA)-RNTI. A high overhead may result from the UE having to successfully receive and decode both the RAR for the initial transmission and the DCI 0_0 (e.g., TC-RNTI DCI) for the retransmission.

If the initial transmission fails, the base station may request a retransmission by providing, to the UE, a PDCCH that carries the DCI 0_0 having CRC scrambled by the TC-RNTI. The DCI may include a repetition configuration for the 4 Msg3 PUSCH retransmissions, as well as scheduling information. However, retransmissions may increase initial access latency. Thus, Msg3 PUSCH repetition may be performed to increase Msg3 coverage. PUSCH repetitions may be enabled for both initial transmission and retransmission.

Figure 6:
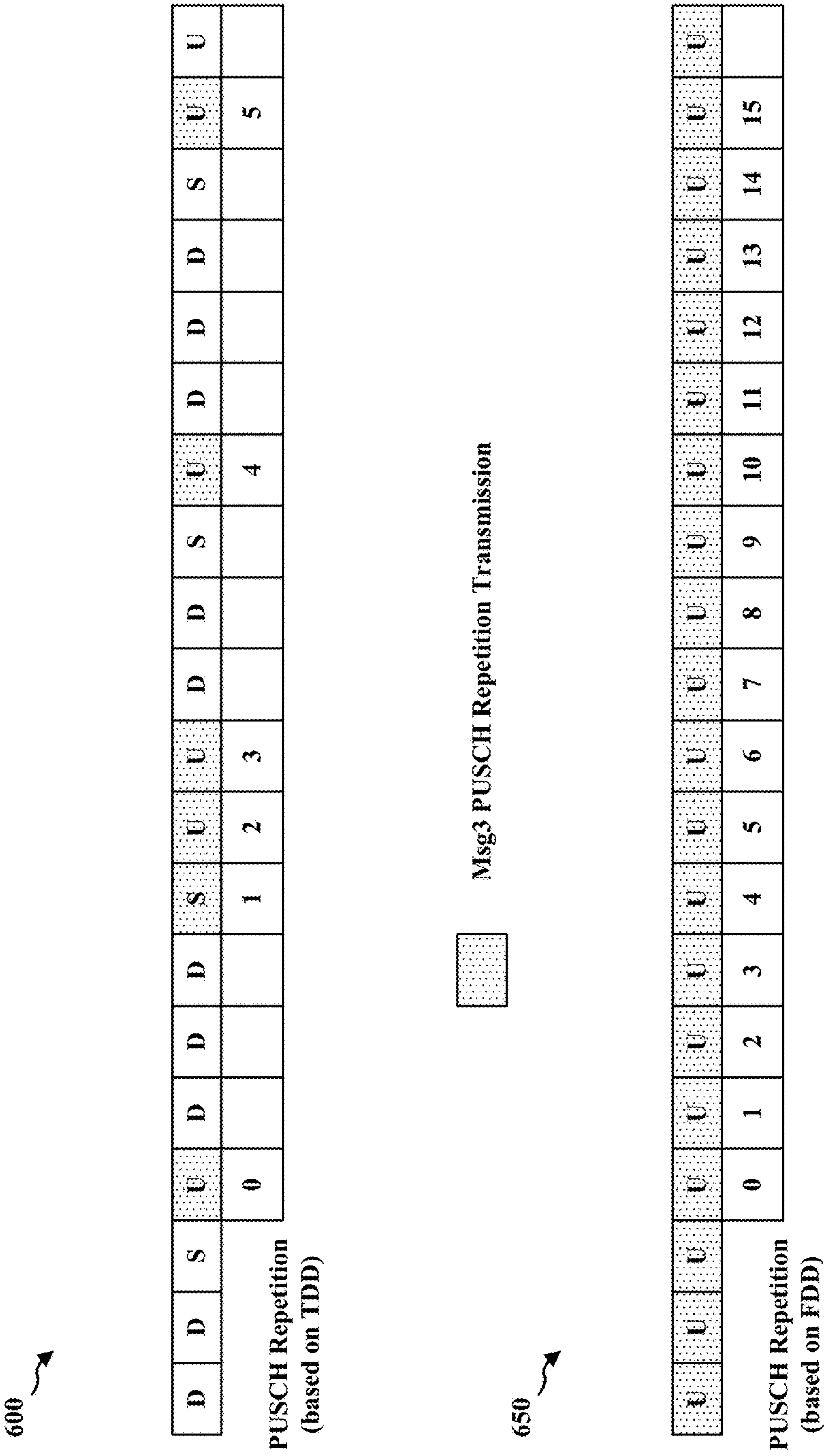
FIG. 6 illustrates diagrams indicative of Type A PUSCH repetition procedures.

FIG. 6 illustrates diagrams 600-650 indicative of Type A PUSCH repetition procedures. The UE may repeat a PUSCH carrying the same TB across available slots based on a same symbol allocation in each of the slots (e.g., based on a same starting symbol and transmission duration). The diagram 600 may be based on a TDD PUSCH repetition procedure and the diagram 650 may be based on an FDD PUSCH repetition procedure.

In the diagram 600 indicative of the TDD repetition procedure, 6 PUSCH repetitions 0-5 may be performed. Repetition numbering/counting may be based on available slots in the diagram 600 (e.g., slots that satisfy conditions for Type A PUSCH repetition). Both uplink slots and flexible/special slots may be available slots for PUSCH repetition. However, some of the flexible/special slots may not be available slots for PUSCH repetition. Transmissions in special slots may start at a same symbol number and have a same transmission duration, such that the UE may transmit based on Type A.

Type B transmissions may not have the same starting symbol number in each slot and/or the same transmission duration. For FDD repetition procedures, such as in the diagram 650, the uplink transmission may correspond to different carriers than the downlink reception. Thus, the special slot may be disregarded as long as all of the uplink slots are associated with the same symbol allocation for PUSCH transmission. In the diagram 650, 16 PUSCH repetitions 0-15 may be performed based on the FDD repetition procedure.

Figure 7:
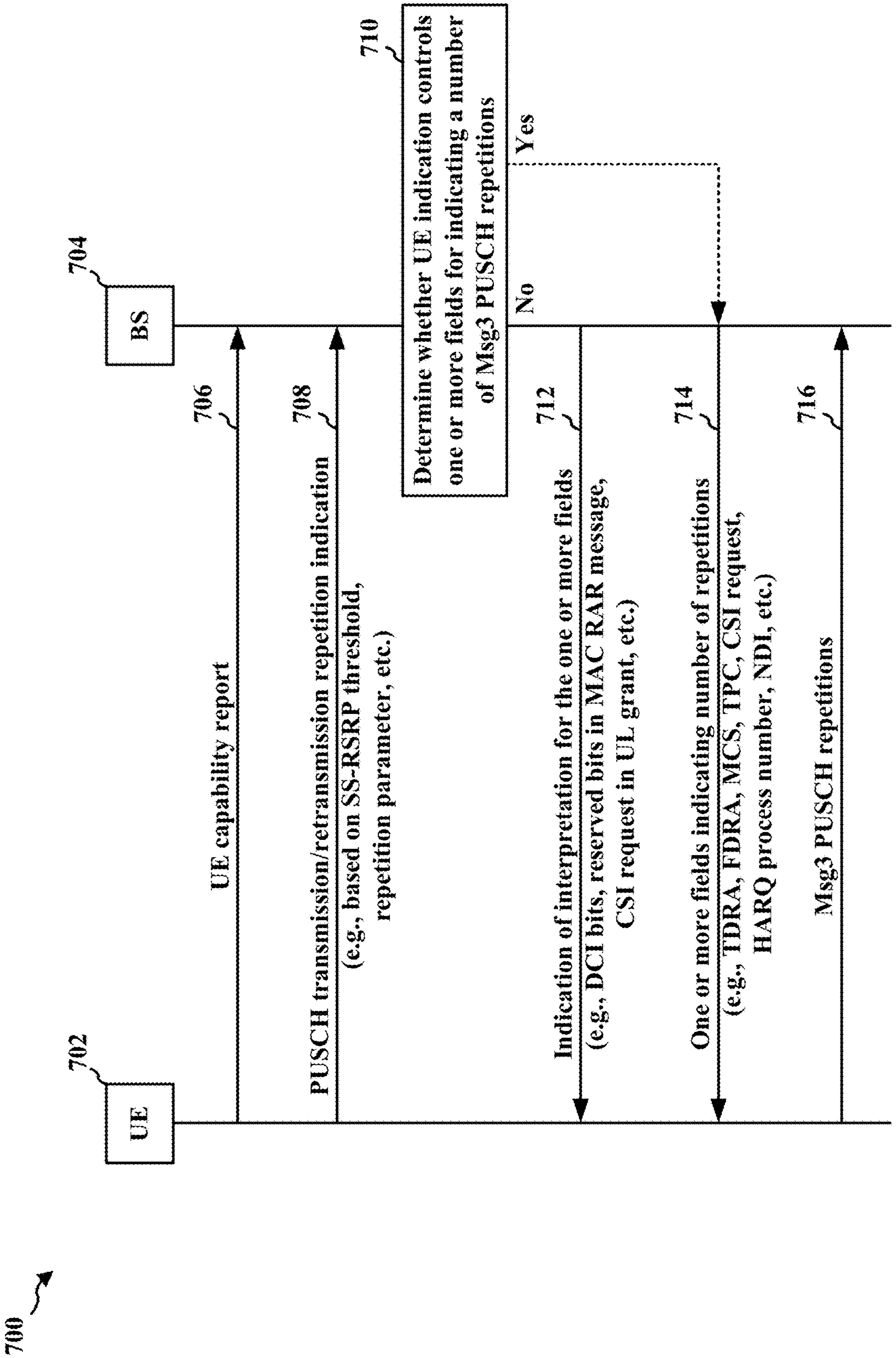
FIG. 7 is a call flow diagram illustrating communications between a UE and a base station.

FIG. 7 is a call flow diagram 700 illustrating communications between a UE 702 and a base station 704. At 706, the UE 702 may transmit a UE capability report to the base station 704. The UE capability report may be indicative of whether the UE 702 supports Msg3 PUSCH repetitions.

At 704, the UE 702 may transmit a PUSCH transmission/retransmission repetition indication to the base station 704. In a first example, the indication may correspond to a request for the UE 702 to transmit the Msg3 PUSCH repetitions to the base station 704. The request may be based on a measured SS-RSRP threshold. In a second example, the indication may control whether one or more fields indicate a number of the repetitions for the PUSCH transmission/retransmission. For instance, the indication may include a repetition parameter indicative of the number of repetitions for the PUSCH transmission/retransmission.

At 710, the base station 704 may determine whether the UE indication controls the one or more fields for indicating the number of Msg3 PUSCH repetitions. If the indication received, at 708, by the base station 704 is a request that does not control the one or more fields for indicating the number of Msg3 PUSCH repetitions, the base station 704 may transmit, at 712, an indication of an interpretation for the one or more fields. The indication may be transmitted, at 712, to the UE 702 via DCI bits, reserved bits in a MAC RAR message, or a CSI request in an uplink grant.

After the base station 704 transmits, at 712, the indication to the UE 702, or if the indication received, at 708, by the base station 704 is a request that does control the one or more fields for indicating the number of Msg3 PUSCH repetitions, the base station 704 may transmit, at 717, the one or more fields indicating the number of repetitions. The one or more fields may include any of a TDRA information field, an FDRA information field, an MCS information field, a TPC information field, a CSI request information field, a HARQ process number, or an NDI.

At 716, if the repetition indication transmitted, at 708, does not control the one or more fields, the UE 702 may transmit the Msg3 PUSCH repetitions to the base station 704 based on the indication received, at 712, of the interpretation of the one or more fields. If the repetition indication transmitted, at 708, does control the one or more fields, the UE 702 may transmit, at 716, the Msg3 PUSCH repetitions to the base station 704 based on the repetition indication transmitted, at 708.

Accordingly, the UE 402/702 may be configured to transmit, at 406/708, a request to the base station 404/704 to perform Msg3 PUSCH repetitions via PRACH. The request may be based on a separate PRACH occasion or separate PRACH preamble in instances of shared PRACH occasions after SSB association. Transmission of the request by the UE 702 may also be based on predetermined conditions (e.g., a measured SS-RSRP threshold). If the RSRP of a downlink reference signal is below the threshold, the UE 702 may determine to request the base station 704 to configure the UE 702 for Msg3 repetition. The UE 702 may transmit, at 406/708, the request via Msg1. Thus, the Msg1 transmission may both initiate the 4-step RACH procedure of the diagram 400 and carry the request for the network to enable Msg3 repetition.

A UE capability for supporting Msg3 PUSCH repetition may be reported, at 706, to the base station 704 after an initial access procedure. If the Msg3 PUSCH repetition is requested by UE 702, the base station 704 may determine whether or not to schedule the Msg3 PUSCH repetition. For example, the UE 702 may request Msg3 PUSCH repetitions, but the base station 704 may decline to configure the UE 702 based on the Msg3 PUSCH repetitions. If the base station 704 determines to schedule the Msg3 PUSCH repetitions, the base station 704 may also determine a number of repetitions for the Msg3 PUSCH (e.g., 3 transmission/retransmissions).

One or more bit fields in the initial Msg3 PUSCH transmission may be reconfigured in the RAR UL grant for indicating the number of repetitions for the initial Msg3 transmission. The RAR may include the timing advance, the UL grant for the Msg3, the TC-RNTI, etc. The indication of the number of repetitions may be included in the UL grant for the Msg3, which may include at least one of a time domain resource allocation (TDRA) bit field/information field based on a TDRA table indicative of a repetition factor, a modulation and coding scheme (MCS) bit field/information field (e.g., 4 bits), a transmit power control (TPC) bit field/information field (e.g., 3 bits), a channel state information (CSI) request bit field/information field, a frequency domain resource allocation (FDRA) bit field/information field, or other similar bit fields/information fields. A predefined information field in the RAR UL grant may be selected for indicating the number of repetitions for the initial Msg3 transmission. Indications in the RAR may correspond to a bitmap associated with a row index of a bit table. A field in the UL grant may be indicative of a row of a column to be utilized from the bit table.

One or more bit fields may be reconfigured via DCI 0_0 having CRC scrambled by TC-RNTI for indicating, at 714, repetitions of the Msg3 PUSCH retransmissions. For example, the TDRA bit field based on the TDRA table indicative of the repetition factor, the MCS bit field, the TPC bit field, the FDRA bit field, a HARQ process number, etc., may be reconfigured via DCI 0_0. Reconfiguring the bit fields may cause the UE 702 to interpret the bit fields (e.g., at 712) differently from a prior configuration of the bit fields.

The initial Msg3 transmission and Msg3 retransmissions may correspond to different DCI scheduling formats. Thus, the CSI request field may not be included in the Msg3 retransmission, but the Msg3 retransmission may be associated with a HARQ process number. In a first example, a same bit field used for indicating, at 714, repetitions of the initial Msg3 transmission may be used for indicating, at 714, repetitions of the Msg3 retransmissions. In a second example, a HARQ process number bit field in DCI format 0_0 having CRC scrambled by TC-RNTI may be used for indicating, at 714, repetitions of the Msg3 retransmissions.

The number of repetitions may be indicated, at 714, to the UE 702 based on reconfiguring a predefined bit field. If Msg3 PUSCH repetition is requested, at 708, by the UE 702, the base station 704 may determine whether or not to schedule the Msg3 PUSCH repetition. If the base station 704 determines not to schedule the Msg3 PUSCH repetition, the bit field may not be reconfigured. If the base station 704 does determine to schedule the Msg3 PUSCH repetition, the bit field may be reconfigured. However, in such cases, the UE 702 may not be able to determine the bit field selected by the base station 704 for scheduling the repetitions. For example, if the TDRA field is selected by the base station 704 for scheduling the repetitions, the UE 702 that requested Msg3 PUSCH repetition may not be able to determine prior to receiving the bit field that the base station 704 is indicating the repetitions via the TDRA bit field. Therefore, the base station 704 may have to indicate, at 712, to the UE 702 whether the bit field is to be reconfigured or interpreted differently.

In some examples, the bit field may be reconfigured or interpreted differently to indicate the number of Msg3 PUSCH repetitions without an indication, at 712, from the base station 704. For instance, Msg3 PUSCH repetition may be indicated based on receiving, at 714, a bit field that does not correspond to repetition information. If the base station 704 determines not to enable Msg3 PUSCH repetition, the base station 704 may indicate a repetition factor of 1 (e.g., to indicate no repetitions) in the bit field. If the UE 702 requests, at 708, Msg3 PUSCH repetition, the bit field selected for indicating the number of repetitions (e.g., the bit field that does not correspond to repetition information) may be interpreted for determining repetition information. In further cases, enabling the bit field to be interpreted differently may only occur when the base station 704 determines that repetition is to be performed. Thus, the base station 704 may control whether or not the bit field is reconfigured/interpreted differently.

The initial Msg3 PUSCH transmission may be based on DCI 1_0 having CRC scrambled by RA-RNTI. The information transmitted in DCI 1_0 may include FDRA $$-\lceil \log_2(N_{RB}^{DL\ BWP}(N+1)/2\rceil$$

bits, where $$N_{RB}^{DL\ BWP}.$$

corresponds to a size of CORESET 0, if CORESET 0 is configured for the cell, and/or to a size of the initial downlink BWP, if CORESET 0 is not configured for the cell. The information transmitted in DCI 1_0 may also be indicative of a TDRA (e.g., 4 bits), a virtual resource block (VRB)-to-PRB mapping (e.g., 1 bit), an MCS (e.g., 5 bits), TB scaling (e.g., 2 bits), and reserved bits (e.g., 16 bits). A 1-bit flag may be included in DCI format 1_0 having CRC scrambled by RA-RNTI using one of the reserved bits to indicate, at 712, whether a bit field is reconfigured/interpreted differently for determining the number of repetitions for the initial Msg3 PUSCH transmission.

Including the 1-bit flag in the DCI may modify a structure of the DCI format 1_0. Thus, the initial Msg3 PUSCH transmission may alternatively be based on a MAC RAR. The MAC RAR may include a MAC subheader and a MAC payload. A reserved bit in either the MAC subheader for the RAR or the MAC payload for the RAR may be used to indicate, at 712, whether the bit field is reconfigured/ interpreted differently to determine the number of repetitions for the initial Msg3 PUSCH transmission. For example, the reserved bit may be set to 0 for both the MAC subheader and the MAC payload to indicate the originally intended interpretation, whereas the reserved bit may be set to 1 for both the MAC subheader and the MAC payload to indicate a different/changed interpretation. Setting the reserved bit for one of the MAC subheader or the MAC payload may be sufficient to indicate, at 712, the intended interpretation.

FIG. 8 is a table 800 indicative of RAR grant content fields. The table 800 may be associated with an uplink grant in MAC RAR and may include RAR grant fields and fields for a number of bits that correspond to the RAR grant fields. The RAR grant fields may include a frequency hopping indicator, a PUSCH frequency resource allocation, a PUSCH time resource allocation, an MCS, a TPC command for the PUSCH, a CSI request, channel access-CPext, etc.

In the table 800, the frequency hopping indicator may correspond to 1 bit, the PUSCH frequency resource allocation may correspond to 14 bits for procedures without shared spectrum channel access and 12 bits for procedures with shared channel access, the PUSCH time resource allocation may correspond to 4 bits, the MCS may correspond to 4 bits, the TPC command for the PUSCH may correspond to 3 bits, the CSI request may correspond to 1 bit, and the channel access-CPext may correspond to 0 bits for procedures without shared spectrum channel access and 2 bits for procedures with shared spectrum channel access. The CSI request, which may be reserved in the UL grant for the initial Msg3 PUSCH transmission, may be used to indicate, at 712, whether the bit field is reconfigured/interpreted differently for determining the number of repetitions for the initial Msg3 PUSCH transmission.

Msg3 PUSCH retransmissions may be based on DCI 0_0 having CRC scrambled by TC-RNTI. A new data indicator (NDI), which may correspond to 1 of the reserved bits, or a HARQ process number, which may correspond to 4 of the reserved bits, may be used to indicate, at 712, whether the bit field is reconfigured/interpreted differently for determining the number of repetitions for Msg3 PUSCH retransmission. The NDI field and the HARQ process number field may both be associated with the reserved bits.

In an example, the NDI bit may be used to indicate, at 712, the interpretation of the field, e.g., in cases where the 4 bits of the HARQ process number field are being used to indicate, at 714, the number of repetitions. In another example, where up to 3 bits of the HARQ process number field are being used to indicate, at 714, the number of repetitions, 1 bit of the HARQ process number field may be used to indicate, at 712, the interpretation of the field. Since the NDI and the HARQ process number correspond to reserved fields, the NDI and the HARQ process number may not be associated with alternative interpretations from indicating the number of repetitions.

Figure 9:
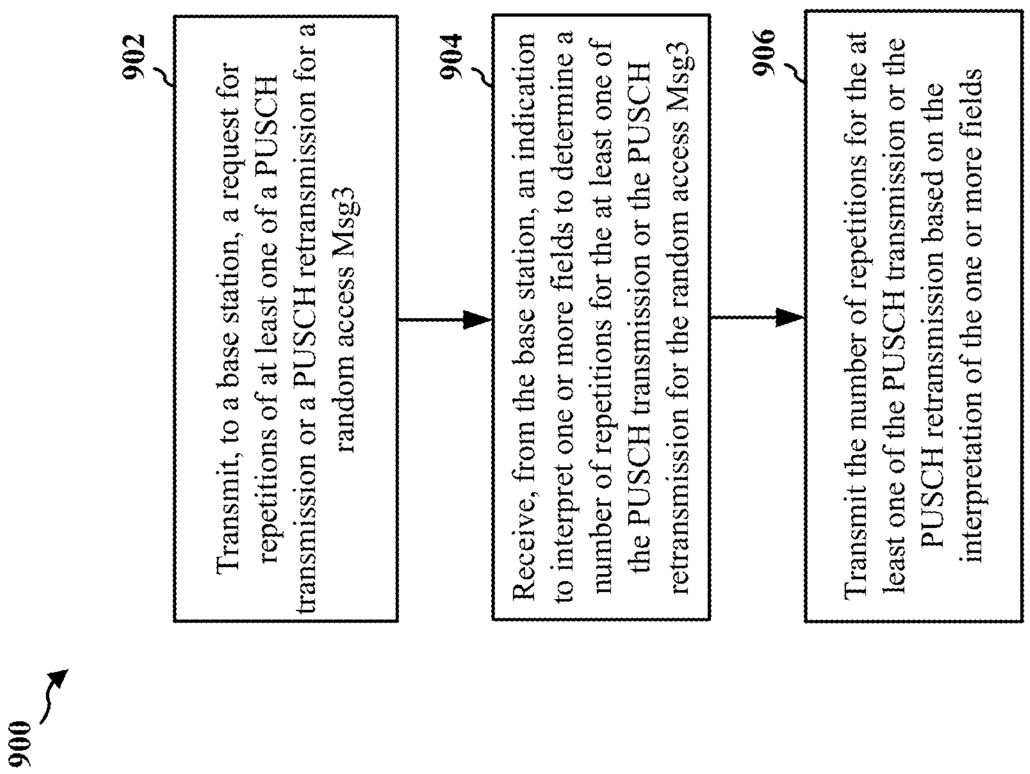
FIG. 9 is a flowchart of a method of wireless communication at a UE.

FIG. 9 is a flowchart 900 of a method of wireless communication. The method may be performed by a UE (e.g., the UE 104, 402, 702; the apparatus 1502; etc.), which may include the memory 360 and which may be the entire UE 104, 402, 702 or a component of the UE 104, 402, 702, such as the TX processor 368, the RX processor 356, and/or the controller/processor 359. The method may provide an improved technique for reducing signaling overhead.

At 902, the UE may transmit, to a base station, a request for repetitions of at least one of a PUSCH transmission or a PUSCH retransmission for a random access Msg3. For example, referring to FIG. 7, the UE 702 may transmit, at 708, a PUSCH transmission/retransmission repetition indication/request to the base station 704. In aspects, the indication/request transmitted, at 708, to the base station 704 may be based on an SS-RSRP threshold. The transmission of the request may be performed by the PUSCH repetition component 1540 of the apparatus 1502 in FIG. 15.

At 904, the UE may receive, from the base station, an indication to interpret one or more fields to determine a number of repetitions for the at least one of the PUSCH transmission or the PUSCH retransmission for the random access Msg3. For example, referring to FIG. 7, the UE 702 may receive, at 712, an indication from the base station 704 to interpret one or more field(s) for determining the number of Msg3 PUSCH repetitions (e.g., to be transmitted at 716). The reception of the indication may be performed by the PUSCH repetition component 1540 of the apparatus 1502 in FIG. 15.

At 906, the UE may transmit the number of repetitions for the at least one of the PUSCH transmission or the PUSCH retransmission based on the interpretation of the one or more fields. The transmission may be performed by the PUSCH repetition component 1540 of the apparatus 1502 in FIG. 15. For example, referring to FIG. 7, the UE 702 may transmit, at 716, Msg3 PUSCH repetitions to the base station 704 based on the indication of the interpretation for the one or more fields received, at 712, from the base station 704.

Figure 10:
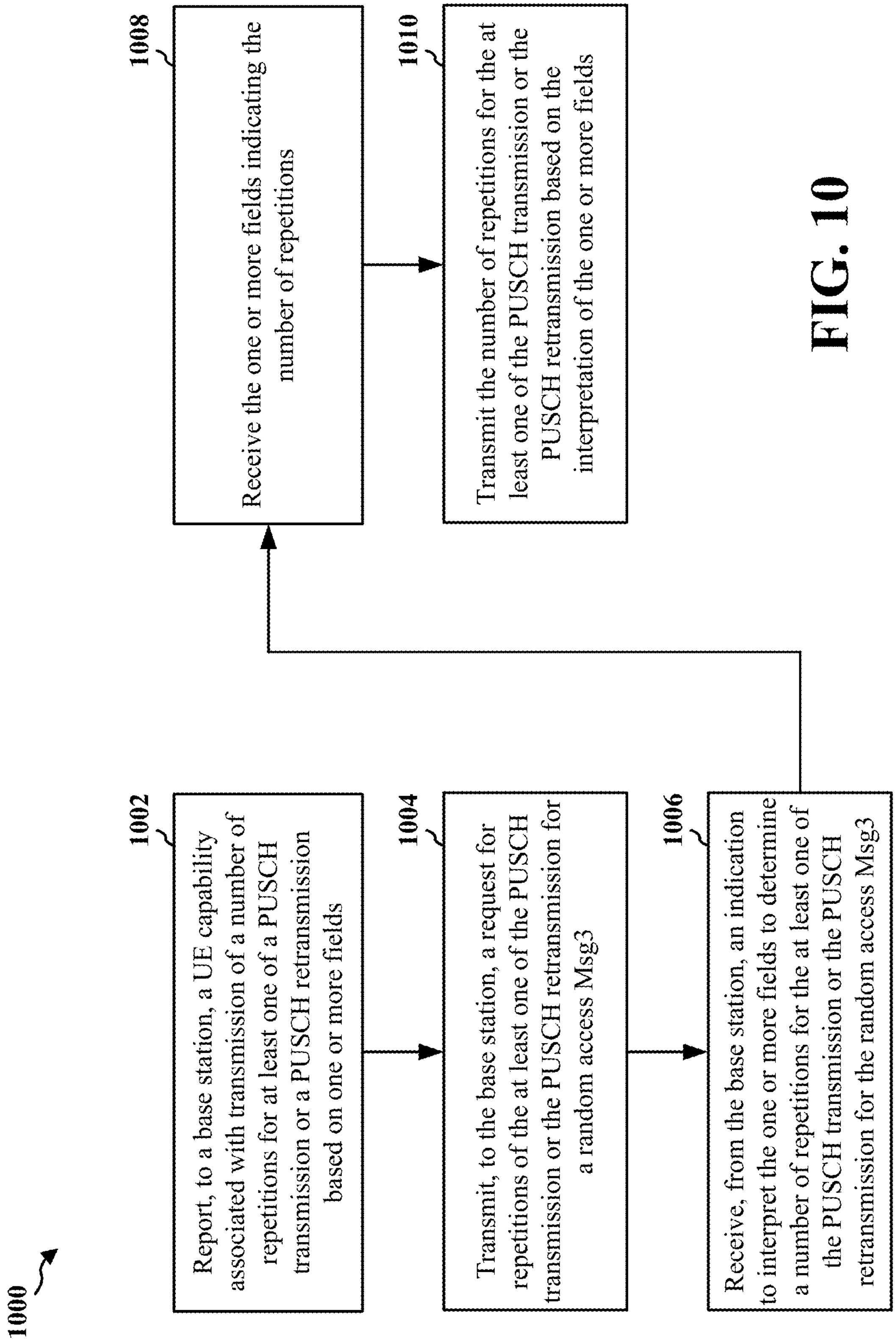
FIG. 10 is a flowchart of a method of wireless communication at a UE.

FIG. 10 is a flowchart 1000 of a method of wireless communication. The method may be performed by a UE (e.g., the UE 104, 402, 702; the apparatus 1502; etc.), which may include the memory 360 and which may be the entire UE 104, 402, 702 or a component of the UE 104, 402, 702, such as the TX processor 368, the RX processor 356, and/or the controller/processor 359. The method may provide an improved technique for reducing signaling overhead.

At 1002, the UE may report, to a base station, a UE capability associated with transmission of a number of repetitions for at least one of a PUSCH transmission or a PUSCH retransmission based on one or more fields. For example, referring to FIG. 7, the UE 702 may transmit, at 706, a UE capability report to the base station 704 for Msg3 PUSCH repetitions. The report may be performed by the PUSCH repetition component 1540 of the apparatus 1502 in FIG. 15.

At 1004, the UE may transmit, to the base station, a request for repetitions of the at least one of the PUSCH transmission or the PUSCH retransmission for a random access Msg3. For example, referring to FIG. 7, the UE 702 may transmit, at 708, a PUSCH transmission/retransmission repetition indication/request to the base station 704. In aspects, the indication/request transmitted, at 708, to the base station 704 may be based on an SS-RSRP threshold. The transmission may be performed by the PUSCH repetition component 1540 of the apparatus 1502 in FIG. 15.

At 1006, the UE may receive, from the base station, an indication to interpret the one or more fields to determine a number of repetitions for the at least one of the PUSCH transmission or the PUSCH retransmission for the random access Msg3. The reception may be performed by the PUSCH repetition component 1540 of the apparatus 1502 in FIG. 15. For example, referring to FIGS. 5 and 7, the UE 702 may receive, at 712, an indication from the base station 704 to interpret one or more field(s) for determining the number of Msg3 PUSCH repetitions (e.g., to be transmitted at 716). The one or more fields (e.g., indicated at 714) may be associated with at least one of an uplink grant of an RAR message (e.g., based on the diagram 500), a DCI 1_0 having CRC bits scrambled by an RA-RNTI (e.g., based on the diagram 500), or a DCI 0_0 having CRC bits scrambled by a TC-RNTI (e.g., based on the diagram 500). In a first example, the indication received, at 712, from the base station 704 may correspond to one or more bits in the DCI 1_0, where the one or more bits may be indicative of whether the one or more fields (e.g., indicated at 714) indicate the number of repetitions for the PUSCH transmission. In a second example, the indication received, at 712, from the base station 704 may correspond to one or more reserved bits in at least one of a MAC subheader for the RAR message or a MAC payload for the RAR message, where the one or more reserved bits may be indicative of whether the one or more fields (e.g., indicated at 714) indicate the number of repetitions for the PUSCH transmission. In a third example, the indication received, at 712, from the base station 704 may correspond to a CSI request information field in the uplink grant, where the CSI request information field may be indicative of whether the one or more fields (e.g., indicated at 714) indicate the number of repetitions for the PUSCH transmission.

At 1008, the UE may receive the one or more fields indicating the number of repetitions. The reception may be performed by the PUSCH repetition component of the apparatus 1502 in FIG. 15. For example, referring to FIG. 7, the UE 702 may receive, at 714, one or more fields from the base station 704 indicating the number of Msg3 PUSCH repetitions. The one or more fields may include at least one of a TDRA information field, an FDRA information field, an MCS information field, a TPC information field, a CSI request information field, a HARQ process number, or an NDI. In examples, the indication received, at 714, from the base station 704 may correspond to at least one of the HARQ process number or the NDI, where the at least one of the HARQ process number or the NDI may be indicative of whether the one or more fields indicate the number of repetitions for the PUSCH retransmission.

At 1010, the UE may transmit the number of repetitions for the at least one of the PUSCH transmission or the PUSCH retransmission based on the interpretation of the one or more fields. The transmission may be performed by the PUSCH repetition component 1540 of the apparatus 1502 in FIG. 15. For example, referring to FIG. 7, the UE 702 may transmit, at 716, Msg3 PUSCH repetitions to the base station 704 based on the indication of the interpretation for the one or more fields received, at 712, from the base station 704.

Figure 11:
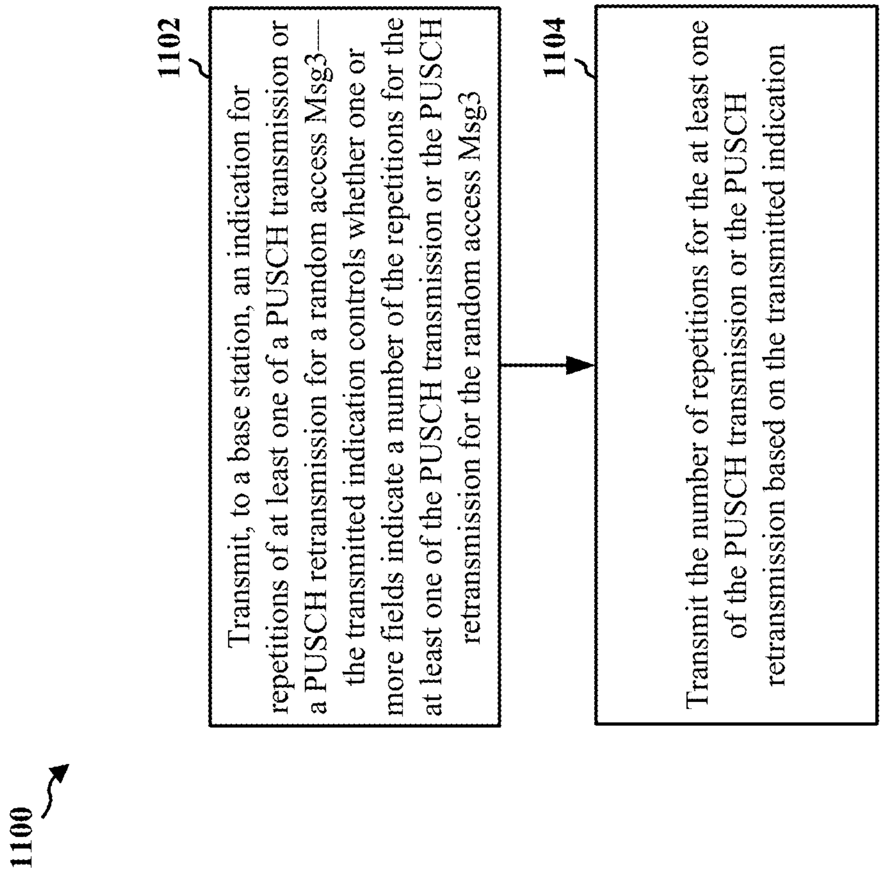
FIG. 11 is a flowchart of a method of wireless communication at a UE.

FIG. 11 is a flowchart 1100 of a method of wireless communication. The method may be performed by a UE (e.g., the UE 104, 402, 702; the apparatus 1502; etc.), which may include the memory 360 and which may be the entire UE 104, 402, 702 or a component of the UE 104, 402, 702, such as the TX processor 368, the RX processor 356, and/or the controller/processor 359. The method may provide an improved technique for reducing signaling overhead.

At 1102, the UE may transmit, to a base station, an indication for repetitions of at least one of a PUSCH transmission or a PUSCH retransmission for a random access Msg3—the transmitted indication controls whether one or more fields indicate a number of the repetitions for the at least one of the PUSCH transmission or the PUSCH retransmission for the random access Msg3. The transmission may be performed by the PUSCH repetition component 1540 of the apparatus 1502 in FIG. 15. For example, referring to FIG. 7, the UE 702 may transmit, at 708, a PUSCH transmission/retransmission repetition indication to the base station 704 for transmitting, at 716, Msg3 PUSCH repetitions to the base station 704. The indication transmitted, at 708, may control whether one or more fields are to be used, at 714, to indicate the number of repetitions. In aspects, the indication transmitted, at 708, to the base station 704 may include a repetition parameter indicative of the number of repetitions for the at least one of the PUSCH transmission or the PUSCH retransmission for the random access Msg3.

At 1104, the UE may transmit the number of repetitions for the at least one of the PUSCH transmission or the PUSCH retransmission based on the transmitted indication. The transmission may be performed by the PUSCH repetition component 1540 of the apparatus 1502 in FIG. 15. For example, referring to FIG. 7, the UE 702 may transmit, at 716, the Msg3 PUSCH repetitions to the base station 704 based on the PUSCH transmission/retransmission repetition indication transmitted, at 708, that controls whether the one or more fields indicate the number of repetitions.

Figure 12:
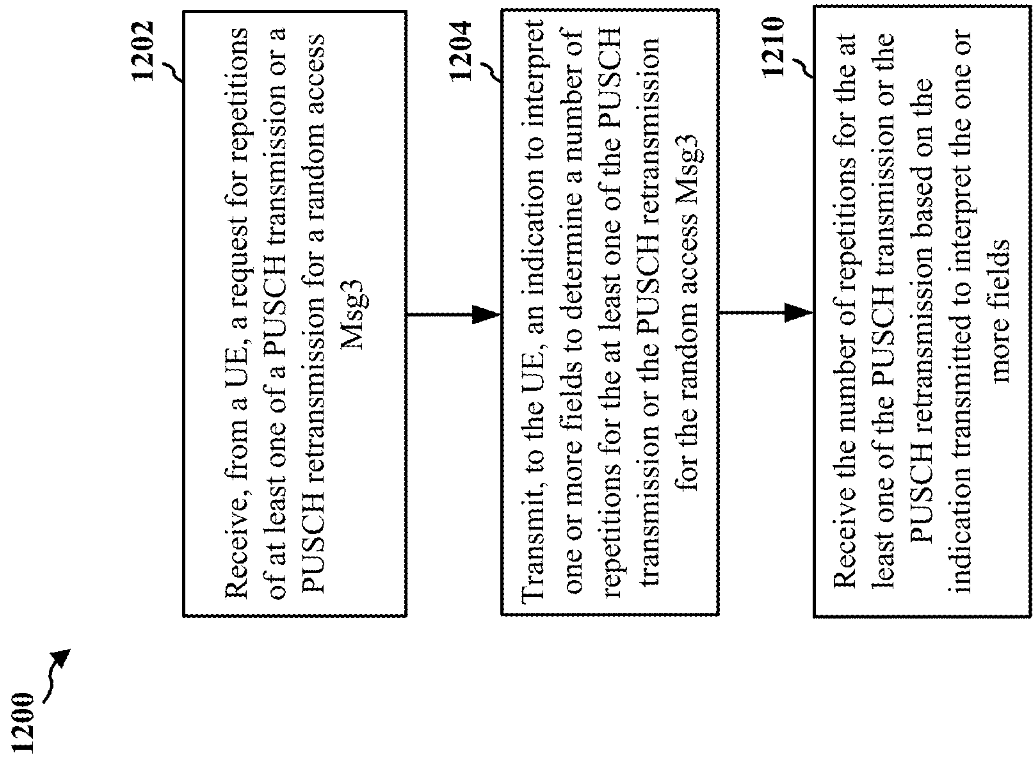
FIG. 12 is a flowchart of a method of wireless communication at a base station.

FIG. 12 is a flowchart 1200 of a method of wireless communication. The method may be performed by a base station (e.g., the base station 102, 404, 704; the apparatus 1602; etc.), which may include the memory 376 and which may be the entire base station 102, 404, 504, 704 or a component of the base station 102, 404, 704, such as the TX processor 316, the RX processor 370, and/or the controller/processor 375. The method may provide an improved technique for reducing signaling overhead.

At 1202, the base station may receive, from a UE, a request for repetitions of at least one of a PUSCH transmission or a PUSCH retransmission for a random access Msg3. The reception may be performed by the field interpretation component 1640 of the apparatus 1602 in FIG. 16. For example, referring to FIG. 7, the base station 704 may receive, at 708, a PUSCH transmission/retransmission repetition indication/request from the UE 702.

At 1204, the base station may transmit, to the UE, an indication to interpret one or more fields to determine a number of repetitions for the at least one of the PUSCH transmission or the PUSCH retransmission for the random access Msg3. The transmission may be performed by the field interpretation component 1640 of the apparatus 1602 in FIG. 16. For example, referring to FIG. 7, the base station 704 may transmit, at 712, an indication to the UE 702 to interpret one or more field(s) for determining the number of Msg3 PUSCH repetitions (e.g., to be received at 716).

At 1206, the base station may receive the number of repetitions for the at least one of the PUSCH transmission or the PUSCH retransmission based on the indication transmitted to interpret the one or more fields. The reception may be performed by the field interpretation component 1640 of the apparatus 1602 in FIG. 16. For example, referring to FIG. 7, the base station 704 may receive, at 716, Msg3 PUSCH repetitions from the UE 702 based on the indication of the interpretation for the one or more fields transmitted, at 712, to the UE 702.

Figure 13:
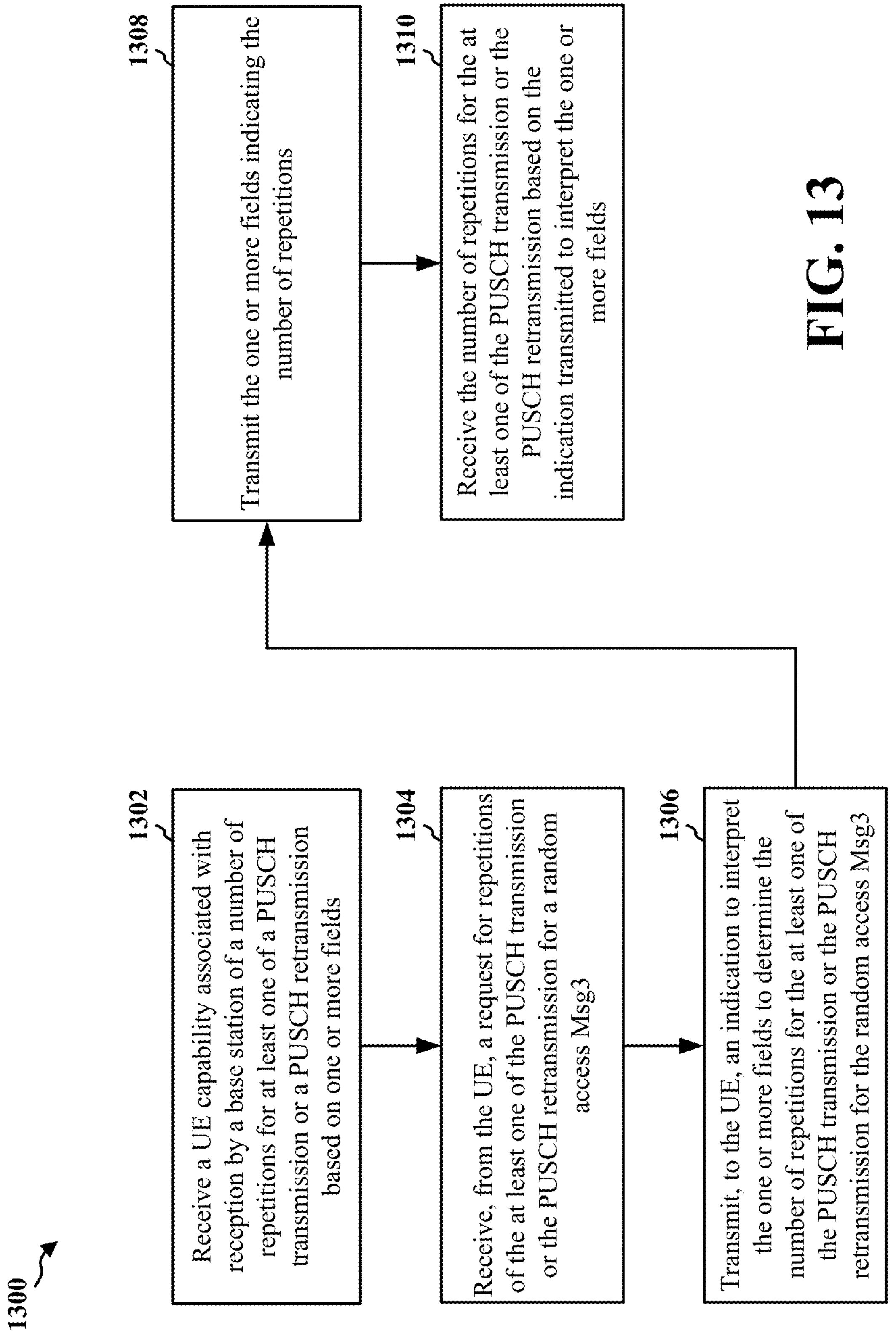
FIG. 13 is a flowchart of a method of wireless communication at a base station.

FIG. 13 is a flowchart 1300 of a method of wireless communication. The method may be performed by a base station (e.g., the base station 102, 404, 704; the apparatus 1602; etc.), which may include the memory 376 and which may be the entire base station 102, 404, 504, 604 or a component of the base station 102, 404, 704, such as the TX processor 316, the RX processor 370, and/or the controller/processor 375. The method may provide an improved technique for reducing signaling overhead.

At 1302, the base station may receive a UE capability associated with reception by a base station of a number of repetitions for at least one of a PUSCH transmission or a PUSCH retransmission based on one or more fields. The reception may be performed by the field interpretation component 1640 of the apparatus 1602 in FIG. 16. For example, referring to FIG. 7, the base station 704 may receive, at 706, a UE capability report from the UE 702 for Msg3 PUSCH repetitions.

At 1304, the base station may receive, from the UE, a request for repetitions of the at least one of the PUSCH transmission or the PUSCH retransmission for a random access Msg3. The reception may be performed by the field interpretation component 1640 of the apparatus 1602 in FIG. 16. For example, referring to FIG. 7, the base station 704 may receive, at 708, a PUSCH transmission/retransmission repetition indication/request from the UE 702.

At 1306, the base station may transmit, to the UE, an indication to interpret the one or more fields to determine the number of repetitions for the at least one of the PUSCH transmission or the PUSCH retransmission for the random access Msg3. The transmission may be performed by the field interpretation component 1640 of the apparatus 1602 in FIG. 16. For example, referring to FIGS. 5 and 7, the base station 704 may transmit, at 712, an indication to the UE 702 to interpret one or more field(s) for determining the number of Msg3 PUSCH repetitions (e.g., to be received at 716). The one or more fields (e.g., indicated at 714) may be associated with at least one of an uplink grant of an RAR message (e.g., based on the diagram 500), a DCI 1_0 having CRC bits scrambled by an RA-RNTI (e.g., based on the diagram 500), or a DCI 0_0 having CRC bits scrambled by a TC-RNTI (e.g., based on the diagram 500). In a first example, the indication transmitted, at 712, to the UE 702 may correspond to one or more bits in the DCI 1_0, where the one or more bits may be indicative of whether the one or more fields (e.g., indicated at 714) indicate the number of repetitions for the PUSCH transmission. In a second example, the indication transmitted, at 712, to the UE 702 may correspond to one or more reserved bits in at least one of a MAC subheader for the RAR message or a MAC payload for the RAR message, where the one or more reserved bits may be indicative of whether the one or more fields (e.g., indicated at 714) indicate the number of repetitions for the PUSCH transmission. In a third example, the indication transmitted, at 712, to the UE 702 may correspond to a CSI request information field in the uplink grant, where the CSI request information field may be indicative of whether the one or more fields (e.g., indicated at 714) indicate the number of repetitions for the PUSCH transmission. At 1308, the base station may transmit the one or more fields indicating the number of repetitions. The transmission may be performed by the field interpretation component 1640 of the apparatus 1602 in FIG. 16. For example, referring to FIG. 7, the base station 704 may transmit, at 714, one or more fields to the UE 702 indicating the number of Msg3 PUSCH repetitions. The one or more fields may include at least one of a TDRA information field, an FDRA information field, an MCS information field, a TPC information field, a CSI request information field, a HARQ process number, or an NDI. In examples, the indication transmitted, at 714, to the UE 702 may correspond to at least one of the HARQ process number or the NDI, where the at least one of the HARQ process number or the NDI may be indicative of whether the one or more fields indicate the number of repetitions for the PUSCH retransmission.

At 1310, the base station may receive the number of repetitions for the at least one of the PUSCH transmission or the PUSCH retransmission based on the indication transmitted to interpret the one or more fields. The reception may be performed by the field interpretation component 1640 of the apparatus 1602 in FIG. 16. For example, referring to FIG. 7, the base station 704 may receive, at 716, Msg3 PUSCH repetitions from the UE 702 based on the indication of the interpretation for the one or more fields transmitted, at 712, to the UE 702.

Figure 14:
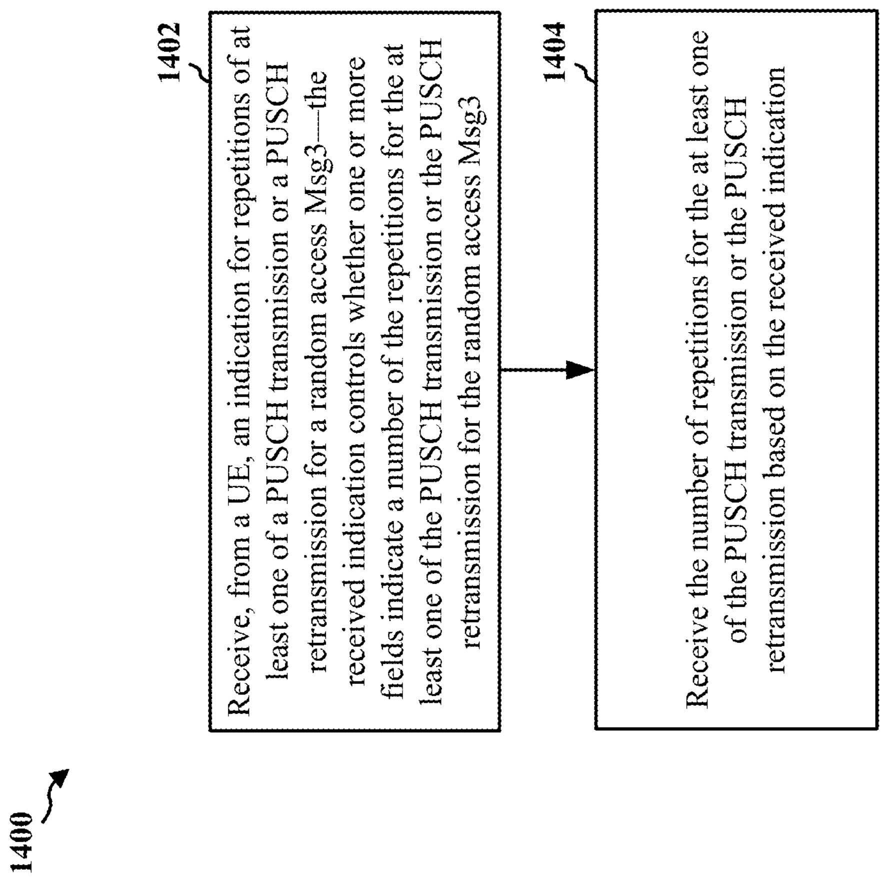
FIG. 14 is a flowchart of a method of wireless communication at a base station.

FIG. 14 is a flowchart 1400 of a method of wireless communication. The method may be performed by a base station (e.g., the base station 102, 404, 704; the apparatus 1602; etc.), which may include the memory 376 and which may be the entire base station 102, 404, 504, 604 or a component of the base station 102, 404, 704, such as the TX processor 316, the RX processor 370, and/or the controller/processor 375. The method may provide an improved technique for reducing signaling overhead.

At 1402, the base station may receive, from a UE, an indication for repetitions of at least one of a PUSCH transmission or a PUSCH retransmission for a random access Msg3—the received indication controls whether one or more fields indicate a number of the repetitions for the at least one of the PUSCH transmission or the PUSCH retransmission for the random access Msg3. The reception may be performed by the field interpretation component 1640 of the apparatus 1602 in FIG. 16. For example, referring to FIG. 7, the base station 704 may receive, at 708, a PUSCH transmission/retransmission repetition indication from the UE 702 for receiving, at 716, Msg3 PUSCH repetitions from the UE 702. The indication received, at 708, may control whether one or more fields are to be used, at 714, to indicate the number of repetitions. In aspects, the indication received, at 708, from the UE 702 may include a repetition parameter indicative of the number of repetitions for the at least one of the PUSCH transmission or the PUSCH retransmission for the random access Msg3.

At 1404, the base station may receive the number of repetitions for the at least one of the PUSCH transmission or the PUSCH retransmission based on the received indication. The reception may be performed by the field interpretation component 1640 of the apparatus 1602 in FIG. 16. For example, referring to FIG. 7, the base station 704 may receive, at 716, the Msg3 PUSCH repetitions from the UE 702 based on the PUSCH transmission/retransmission repetition indication received, at 708, that controls whether the one or more fields indicate the number of repetitions.

Figure 15:
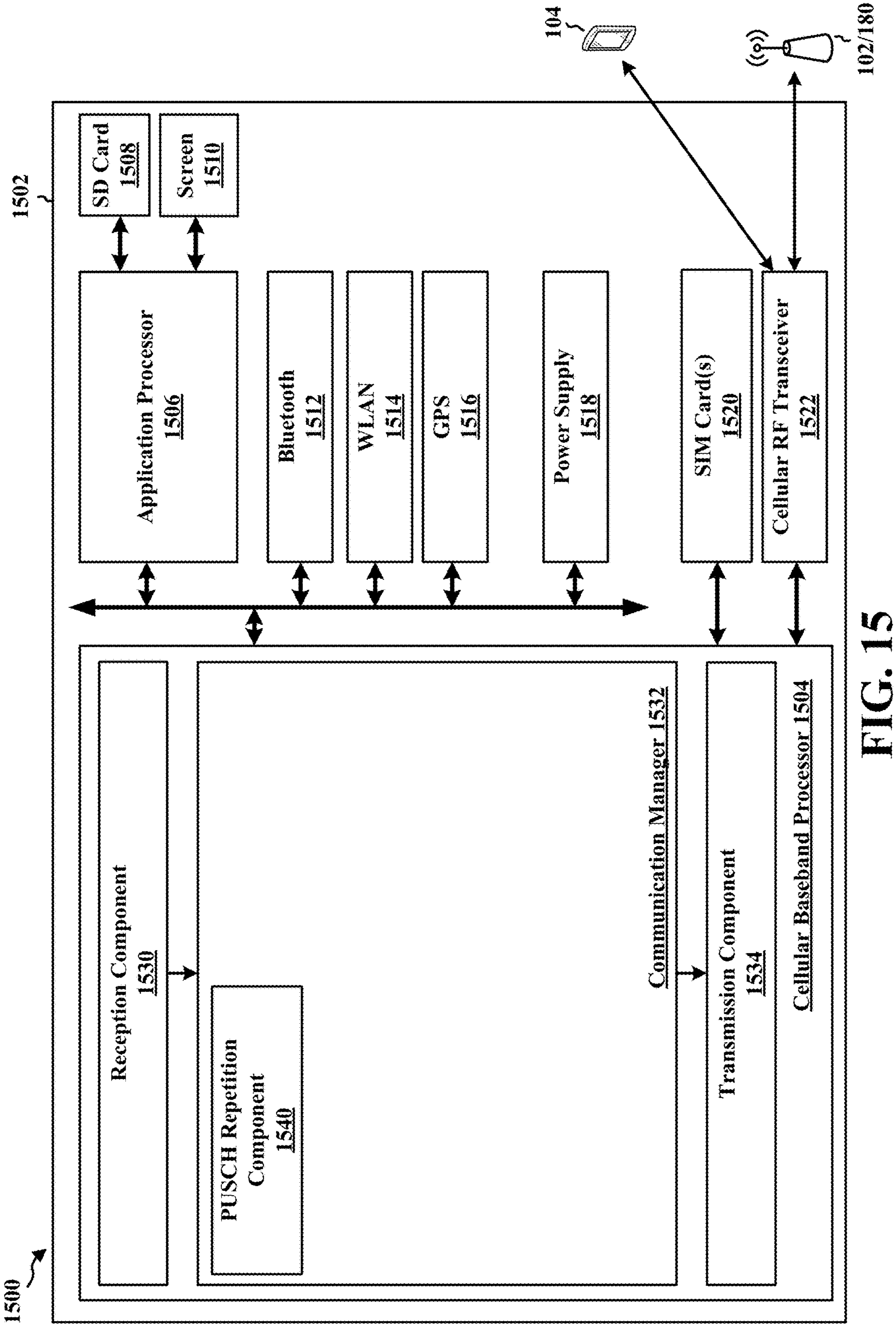
FIG. 15 is a diagram illustrating an example of a hardware implementation for an example apparatus.

FIG. 15 is a diagram 1500 illustrating an example of a hardware implementation for an apparatus 1502. The apparatus 1502 may be a UE, a component of a UE, or may implement UE functionality. In some aspects, the apparatus 1502 may include a cellular baseband processor 1504 (also referred to as a modem) coupled to a cellular RF transceiver 1522. In some aspects, the apparatus 1502 may further include one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, or a power supply 1518. The cellular baseband processor 1504 communicates through the cellular RF transceiver 1522 with the UE 104 and/or BS 102/180. The cellular baseband processor 1504 may include a computer-readable medium/memory. The computer-readable medium/memory may be non-transitory. The cellular baseband processor 1504 is responsible for general processing, including the execution of software stored on the computer-readable medium/memory. The software, when executed by the cellular baseband processor 1504, causes the cellular baseband processor 1504 to perform the various functions described supra. The computer-readable medium/memory may also be used for storing data that is manipulated by the cellular baseband processor 1504 when executing software. The cellular baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the cellular baseband processor 1504. The cellular baseband processor 1504 may be a component of the UE 350 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., see 350 of FIG. 3) and include the additional modules of the apparatus 1502.

The communication manager 1532 includes a PUSCH repetition component 1540 that is configured, e.g., as described in connection with 902-904 and 1002-1004, to report, to a base station, a UE capability associated with transmission of a number of repetitions for at least one of a PUSCH transmission or a PUSCH retransmission based on one or more fields; to transmit, to the base station, a request for repetitions of the at least one of the PUSCH transmission or the PUSCH retransmission for a random access Msg3; to receive, from the base station, an indication to interpret the one or more fields to determine a number of repetitions for the at least one of the PUSCH transmission or the PUSCH retransmission for the random access Msg3; to receive the one or more fields indicating the number of repetitions; and to transmit the number of repetitions for the at least one of the PUSCH transmission or the PUSCH retransmission based on the interpretation of the one or more fields.

The PUSCH repetition component 1540 included in the communication manager 1532 may also be configured, e.g., as described in connection with 1102-1104, to transmit, to a base station, an indication for repetitions of at least one of a PUSCH transmission or a PUSCH retransmission for a random access Msg3—the transmitted indication controls whether one or more fields indicate a number of the repetitions for the at least one of the PUSCH transmission or the PUSCH retransmission for the random access Msg3; and to transmit the number of repetitions for the at least one of the PUSCH transmission or the PUSCH retransmission based on the transmitted indication.

The apparatus may include additional components that perform each of the blocks of the algorithm in the flowcharts of FIGS. 9-11. As such, each block in the flowcharts of FIGS. 9-11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the cellular baseband processor 1504, includes means for transmitting, to a base station, a request for repetitions of at least one of a PUSCH transmission or a PUSCH retransmission for a random access Msg3; and means for receiving, from the base station, an indication to interpret one or more fields to determine a number of repetitions for the at least one of the PUSCH transmission or the PUSCH retransmission for the random access Msg3. The apparatus 1502 further includes means for receiving the one or more fields indicating the number of repetitions, where the one or more fields include at least one of: a TDRA information field, an FDRA information field, an MCS information field, a TPC information field, a CSI request information field, a HARQ process number, or an NDI. The apparatus 1502 further includes means for reporting, to the base station, a UE capability associated with transmission of the number of repetitions for the at least one of the PUSCH transmission or the PUSCH retransmission based on the one or more fields. The apparatus 1502 further includes means for transmitting the number of repetitions for the at least one of the PUSCH transmission or the PUSCH retransmission based on the interpretation of the one or more fields.

In further configurations the apparatus 1502, and in particular the cellular baseband processor 1504, includes means for transmitting, to a base station, an indication for repetitions of at least one of a PUSCH transmission or a PUSCH retransmission for a random access Msg3, where the transmitted indication controls whether one or more fields indicate a number of the repetitions for the at least one of the PUSCH transmission or the PUSCH retransmission for the random access Msg3; and means for transmitting the number of repetitions for the at least one of the PUSCH transmission or the PUSCH retransmission based on the transmitted indication.

The means may be one or more of the components of the apparatus 1502 configured to perform the functions recited by the means. As described supra, the apparatus 1502 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 16:
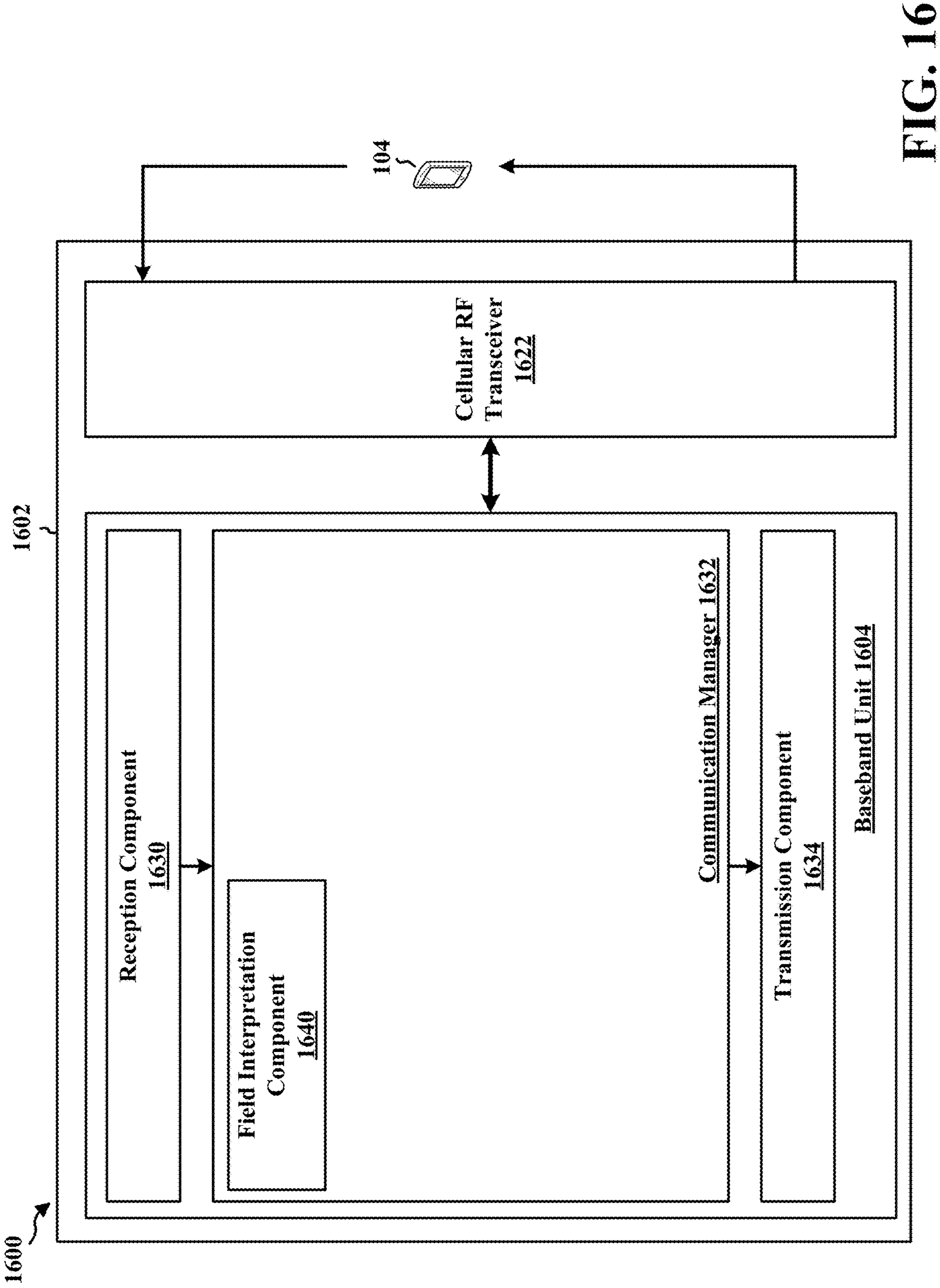
FIG. 16 is a diagram illustrating an example of a hardware implementation for an example apparatus.

FIG. 16 is a diagram 1600 illustrating an example of a hardware implementation for an apparatus 1602. The apparatus 1602 may be a base station, a component of a base station, or may implement base station functionality. In some aspects, the apparatus 1502 may include a baseband unit 1604. The baseband unit 1604 may communicate through a cellular RF transceiver 1622 with the UE 104. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the base station 310 and may include the memory 376 and/or at least one of the TX processor 316, the RX processor 370, and the controller/processor 375.

The communication manager 1632 includes a field interpretation component 1640 that is configured, e.g., as described in connection with 1202-1204 and 1302-1310, to receive a UE capability associated with reception by a base station of a number of repetitions for at least one of a PUSCH transmission or a PUSCH retransmission based on one or more fields; to receive, from the UE, a request for repetitions of the at least one of the PUSCH transmission or the PUSCH retransmission for a random access Msg3; to transmit, to the UE, an indication to interpret the one or more fields to determine the number of repetitions for the at least one of the PUSCH transmission or the PUSCH retransmission for the random access Msg3; to transmit the one or more fields indicating the number of repetitions; and to receive the number of repetitions for the at least one of the PUSCH transmission or the PUSCH retransmission based on the indication transmitted to interpret the one or more fields.

The field interpretation component 1640 included in the communication manager 1632 may also be configured, e.g., as described in connection with 1402-1404, to receive, from a UE, an indication for repetitions of at least one of a PUSCH transmission or a PUSCH retransmission for a random access Msg3—the received indication controls whether one or more fields indicate a number of the repetitions for the at least one of the PUSCH transmission or the PUSCH retransmission for the random access Msg3; and to receive the number of repetitions for the at least one of the PUSCH transmission or the PUSCH retransmission based on the received indication.

The apparatus may include additional components that perform each of the blocks of the algorithm in the flowcharts of FIGS. 12-14. As such, each block in the flowcharts of FIGS. 12-14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the baseband unit 1604, includes means for receiving, from a UE, a request for repetitions of at least one of a PUSCH transmission or a PUSCH retransmission for a random access Msg3; and means for transmitting, to the UE, an indication to interpret one or more fields to determine a number of repetitions for the at least one of the PUSCH transmission or the PUSCH retransmission for the random access Msg3. The apparatus 1602 further includes means for transmitting the one or more fields indicating the number of repetitions, where the one or more fields comprises at least one of: a TDRA information field, an FDRA information field, an MCS information field, a TPC information field, a CSI request information field, a HARQ process number, or an NDI. The apparatus 1602 further includes means for receiving a UE capability associated with reception by the base station of the number of repetitions for the at least one of the PUSCH transmission or the PUSCH retransmission based on the one or more fields. The apparatus 1602 further includes means for receiving the number of repetitions for the at least one of the PUSCH transmission or the PUSCH retransmission based on the indication transmitted to interpret the one or more fields.

In further configurations, the apparatus 1602, and in particular the baseband unit 1604, includes means for receiving, from a UE, an indication for repetitions of at least one of a PUSCH transmission or a PUSCH retransmission for a random access Msg3, where the received indication controls whether one or more fields indicate a number of the repetitions for the at least one of the PUSCH transmission or the PUSCH retransmission for the random access Msg3; and means for receiving the number of repetitions for the at least one of the PUSCH transmission or the PUSCH retransmission based on the received indication.

The means may be one or more of the components of the apparatus 1602 configured to perform the functions recited by the means. As described supra, the apparatus 1602 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means."

As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to transmit, to a base station, a request for repetitions of at least one of a PUSCH transmission or a PUSCH retransmission for a random access Msg3; receive, from the base station, an indication to use one or more fields to determine a number of repetitions of the at least one of the PUSCH transmission or the PUSCH retransmission for the random access Msg3; and transmit the number of repetitions of the at least one of the PUSCH transmission or the PUSCH retransmission based on the use of the one or more fields to determine the number of repetitions of the at least one of the PUSCH transmission or the PUSCH retransmission for the random access Msg3.

Aspect 2 may be combined with aspect 1 and includes that the at least one processor is further configured to receive the one or more fields indicating the number of repetitions, the one or more fields including at least one of: a TDRA information field, a FDRA information field, an MCS information field, a TPC information field, a CSI request information field, a HARQ process number, or an NDI.

Aspect 3 may be combined with any of aspects 1-2 and includes that the indication received from the base station corresponds to at least one of the HARQ process number or the NDI, where the at least one of the HARQ process number or the NDI is indicative of whether the one or more fields indicate the number of repetitions of the PUSCH retransmission.

Aspect 4 may be combined with any of aspects 1-3 and includes that the one or more fields are included in at least one of an uplink grant of an RAR message, a DCI 1_0 having CRC bits scrambled by an RA-RNTI, or a DCI 0_0 having CRC bits scrambled by a TC-RNTI.

Aspect 5 may be combined with any of aspects 1-4 and includes that the indication received from the base station corresponds to one or more bits in the DCI 1_0, the one or more bits indicative of whether the one or more fields indicate the number of repetitions of the PUSCH transmission.

Aspect 6 may be combined with any of aspects 1-5 and includes that the indication received from the base station corresponds to one or more reserved bits in at least one of a MAC subheader for the RAR message or a MAC payload for the RAR message, the one or more reserved bits indicate whether the one or more fields correspond to the number of repetitions of the PUSCH transmission.

Aspect 7 may be combined with any of aspects 1-6 and includes that the indication received from the base station corresponds to a CSI request information field in the uplink grant, the CSI request information field indicative of whether the one or more fields indicate the number of repetitions of the PUSCH transmission.

Aspect 8 may be combined with any of aspects 1-7 and includes that the request is transmitted to the base station based on an SS-RSRP threshold.

Aspect 9 may be combined with any of aspects 1-8 and includes that the at least one processor is further configured to report, to the base station, a UE capability associated with transmission of the number of repetitions of the at least one of the PUSCH transmission or the PUSCH retransmission based on the one or more fields.

Aspect 10 may be combined with any of aspects 1-9 and includes that the request for repetitions of the at least one of the PUSCH transmission or the PUSCH retransmission is transmitted in at least one of a random access request or a random access preamble.

Aspect 11 is an apparatus for wireless communication at a UE including at least one processor coupled to a memory and configured to transmit, to a base station, an indication for repetitions of at least one of a PUSCH transmission or a PUSCH retransmission for a random access Msg3, where the transmitted indication indicates to the base station to use one or more fields to determine a number of the repetitions of the at least one of the PUSCH transmission or the PUSCH retransmission for the random access Msg3; and transmit the number of repetitions of the at least one of the PUSCH transmission or the PUSCH retransmission based on the transmitted indication.

Aspect 12 may be combined with aspect 11 and includes that the indication transmitted to the base station includes a repetition parameter indicative of the number of repetitions of the at least one of the PUSCH transmission or the PUSCH retransmission for the random access Msg3.

Aspect 13 is an apparatus for wireless communication at a base station including at least one processor coupled to a memory and configured to receive, from a UE, a request for repetitions of at least one of a PUSCH transmission or a PUSCH retransmission for a random access Msg3; transmit, to the UE, an indication to use one or more fields to determine a number of repetitions of the at least one of the PUSCH transmission or the PUSCH retransmission for the random access Msg3; and receive the number of repetitions of the at least one of the PUSCH transmission or the PUSCH retransmission based on the indication use the one or more fields to determine the number of repetitions of the at least one of the PUSCH transmission or the PUSCH retransmission for the random access Msg3.

Aspect 14 may be combined with aspect 13 and includes that the at least one processor is further configured to transmit the one or more fields indicating the number of repetitions, the one or more fields including at least one of: a TDRA information field, an FDRA information field, an MCS information field, a TPC information field, a CSI request information field, a HARQ process number, or an NDI.

Aspect 15 may be combined with any of aspects 13-14 and includes that the indication transmitted to the UE corresponds to at least one of the HARQ process number or the NDI, where the at least one of the HARQ process number or the NDI is indicative of whether the one or more fields indicate the number of repetitions of the PUSCH retransmission.

Aspect 16 may be combined with any of aspects 13-15 and includes that the one or more fields are included in at least one of an uplink grant of an RAR message, a DCI 1_0 having CRC bits scrambled by an RA-RNTI, or a DCI 0_0 having CRC bits scrambled by a TC-RNTI.

Aspect 17 may be combined with any of aspects 13-16 and includes that the indication transmitted to the UE corresponds to one or more bits in the DCI 1_0, the one or more bits indicative of whether the one or more fields indicate the number of repetitions of the PUSCH transmission.

Aspect 18 may be combined with any of aspects 13-17 and includes that the indication transmitted to the UE corresponds to one or more reserved bits in at least one of a MAC subheader for the RAR message or a MAC payload for the RAR message, the one or more reserved bits indicate whether the one or more fields correspond to the number of repetitions of the PUSCH transmission.

Aspect 19 may be combined with any of aspects 13-18 and includes that the indication transmitted to the UE corresponds to a CSI request information field in the uplink grant, the CSI request information field indicative of whether the one or more fields indicate the number of repetitions of the PUSCH transmission.

Aspect 20 may be combined with any of aspects 13-19 and includes that the at least one processor is further configured to receive a UE capability associated with reception by the base station of the number of repetitions of the at least one of the PUSCH transmission or the PUSCH retransmission based on the one or more fields.

Aspect 21 may be combined with any of aspects 13-20 and includes that the request for repetitions of the at least one of the PUSCH transmission or the PUSCH retransmission is received in at least one of a random access request or a random access preamble.

Aspect 22 is an apparatus for wireless communication at a base station including at least one processor coupled to a memory and configured to receive, from a UE, an indication for repetitions of at least one of a PUSCH transmission or a PUSCH retransmission for a random access Msg3, where the received indication indicates to the base station one or more fields to determine a number of the repetitions of the at least one of the PUSCH transmission or the PUSCH retransmission for the random access Msg3; and receive the number of repetitions of the at least one of the PUSCH transmission or the PUSCH retransmission based on the received indication.

Aspect 23 may be combined with aspect 22 and includes that the indication received from the UE includes a repetition parameter indicative of the number of repetitions of the at least one of the PUSCH transmission or the PUSCH retransmission for the random access Msg3.

Aspect 24 may be combined with any of aspects 1-23 and further includes a transceiver coupled to the at least one processor.

Aspect 25 is a method of wireless communication for implementing any of aspects 1-24.

Aspect 26 is an apparatus for wireless communication including means for implementing any of aspects 1-24.

Aspect 27 is a computer-readable medium storing computer executable code, the code when executed by at least one processor causes the at least one processor to implement any of aspects 1-24.

What is claimed is:

1. An apparatus for wireless communication at a user equipment (UE), comprising:

a processing system configured to:

transmit, to a base station, a request for repetitions of at least one of a physical uplink shared channel (PUSCH) transmission or a PUSCH retransmission for a random access message 3 (Msg3);

receive, from the base station, an indication of an interpretation for one or more fields, wherein the one or more fields are reconfigured based on the indication to indicate a number of repetitions of the at least one of the PUSCH transmission or the PUSCH retransmission for the random access Msg3;

receive, from the base station, the one or more fields, wherein the one or more fields are indicative of the number of repetitions based on the indication; and transmit the number of repetitions of the at least one of the PUSCH transmission or the PUSCH retransmission based on the use of the one or more fields to determine the number of repetitions of the at least one of the PUSCH transmission or the PUSCH retransmission for the random access Msg3.

2. The apparatus of claim 1, wherein the one or more fields comprise at least one of:

a time domain resource allocation (TDRA) information field, a frequency domain resource allocation (FDRA) information field, a modulation and coding scheme (MCS) information field, a transmit power control (TPC) information field, a channel state information (CSI) request information field, a hybrid automatic repeat request (HARQ) process number, or a new data indicator (NDI).

3. The apparatus of claim 2, wherein the indication received from the base station corresponds to at least one of the HARQ process number or the NDI, wherein the at least one of the HARQ process number or the NDI is indicative of whether the one or more fields indicate the number of repetitions of the PUSCH retransmission.

4. The apparatus of claim 1, wherein the one or more fields are included in at least one of an uplink grant of a random access response (RAR) message, a downlink control information (DCI) 1_0 having cyclic redundancy check (CRC) bits scrambled by a random access-radio network temporary identifier (RA-RNTI), or a DCI 0_0 having CRC bits scrambled by a temporary cell-radio network temporary identifier (TC-RNTI).

5. The apparatus of claim 4, wherein the indication received from the base station corresponds to one or more bits in the DCI 1_0, the one or more bits indicative of whether the one or more fields indicate the number of repetitions of the PUSCH transmission.

6. The apparatus of claim 4, wherein the indication received from the base station corresponds to one or more reserved bits in at least one of a medium access control (MAC) subheader for the RAR message or a MAC payload for the RAR message, the one or more reserved bits indicate whether the one or more fields correspond to the number of repetitions of the PUSCH transmission.

7. The apparatus of claim 4, wherein the indication received from the base station corresponds to a channel state information (CSI) request information field in the uplink grant, the CSI request information field indicative of whether the one or more fields indicate the number of repetitions of the PUSCH transmission.

8. The apparatus of claim 1, wherein the request is transmitted to the base station based on a synchronization signal (SS)-reference signal received power (RSRP) (SS-RSRP) threshold.

9. The apparatus of claim 1, wherein the processing system is further configured to report, to the base station, a UE capability associated with transmission of the number of repetitions of the at least one of the PUSCH transmission or the PUSCH retransmission based on the one or more fields.

10. The apparatus of claim 1, wherein the request for repetitions of the at least one of the PUSCH transmission or the PUSCH retransmission is transmitted in at least one of a random access request or a random access preamble.

11. The apparatus of claim 1, further comprising a transceiver coupled to the processing system.

12. An apparatus for wireless communication at a base station, comprising:

a processing system configured to:

receive, from a user equipment (UE), a request for repetitions of at least one of a physical uplink shared channel (PUSCH) transmission or a PUSCH retransmission for a random access message 3 (Msg3);

transmit, to the UE, an indication of an interpretation for one or more fields, wherein the one or more fields are reconfigured based on the indication to indicate a number of repetitions of the at least one of the PUSCH transmission or the PUSCH retransmission for the random access Msg3;

transmit, to the UE, the one or more fields, wherein the one or more fields are indicative of the number of repetitions based on the indication; and receive the number of repetitions of the at least one of the PUSCH transmission or the PUSCH retransmission based on the indication use the one or more fields to determine the number of repetitions of the at least one of the PUSCH transmission or the PUSCH retransmission for the random access Msg3.

13. The apparatus of claim 12, wherein the one or more fields comprises at least one of:

a time domain resource allocation (TDRA) information field, a frequency domain resource allocation (FDRA) information field, a modulation and coding scheme (MCS) information field, a transmit power control (TPC) information field, a channel state information (CSI) request information field, a hybrid automatic repeat request (HARQ) process number, or a new data indicator (NDI).

14. The apparatus of claim 13, wherein the indication transmitted to the UE corresponds to at least one of the HARQ process number or the NDI, wherein the at least one of the HARQ process number or the NDI is indicative of whether the one or more fields indicate the number of repetitions of the PUSCH retransmission.

15. The apparatus of claim 12, wherein the one or more fields are included in at least one of an uplink grant of a random access response (RAR) message, a downlink control information (DCI) 1_0 having cyclic redundancy check (CRC) bits scrambled by a random access-radio network temporary identifier (RA-RNTI), or a DCI 0_0 having CRC bits scrambled by a temporary cell-radio network temporary identifier (TC-RNTI).

16. The apparatus of claim 15, wherein the indication transmitted to the UE corresponds to one or more bits in the DCI 1_0, the one or more bits indicative of whether the one or more fields indicate the number of repetitions of the PUSCH transmission.

17. The apparatus of claim 15, wherein the indication transmitted to the UE corresponds to one or more reserved bits in at least one of a medium access control (MAC) subheader for the RAR message or a MAC payload for the RAR message, the one or more reserved bits indicate whether the one or more fields correspond to the number of repetitions of the PUSCH transmission.

18. The apparatus of claim 15, wherein the indication transmitted to the UE corresponds to a channel state information (CSI) request information field in the uplink grant, the CSI request information field indicative of whether the one or more fields indicate the number of repetitions of the PUSCH transmission.

19. The apparatus of claim 12, wherein the processing system is further configured to receive a UE capability associated with reception by the base station of the number of repetitions of the at least one of the PUSCH transmission or the PUSCH retransmission based on the one or more fields.

20. The apparatus of claim 12, wherein the request for repetitions of the at least one of the PUSCH transmission or the PUSCH retransmission is received in at least one of a random access request or a random access preamble.

21. The apparatus of claim 12, further comprising a transceiver coupled to the processing system.

* * * * *